(12) United States Patent
Jaisawal

(10) Patent No.: US 12,111,802 B2
(45) Date of Patent: Oct. 8, 2024

(54) DATABASE MANAGEMENT SYSTEMS USING DISTRIBUTED DATABASE UPDATE MANAGEMENT OPERATIONS

(71) Applicant: UnitedHealth Group Incorporated, Minnetonka, MN (US)

(72) Inventor: Sudheer Jaisawal, Gorakhpur (IN)

(73) Assignee: UnitedHealth Group Incorporated, Minnetonka, MN (US)

( * ) Notice: Subject to any disclaimer, the term of this patent is extended or adjusted under 35 U.S.C. 154(b) by 0 days.

(21) Appl. No.: 17/683,967

(22) Filed: Mar. 1, 2022

(65) Prior Publication Data

US 2023/0281173 A1    Sep. 7, 2023

(51) Int. Cl.
| | | |
|---|---|---|
| *G06F 16/00* | (2019.01) | |
| *G06F 11/34* | (2006.01) | |
| *G06F 16/215* | (2019.01) | |
| *G06F 16/23* | (2019.01) | |

(52) U.S. Cl.
CPC ........ *G06F 16/215* (2019.01); *G06F 11/3409* (2013.01); *G06F 16/2358* (2019.01)

(58) Field of Classification Search
None
See application file for complete search history.

(56) References Cited

U.S. PATENT DOCUMENTS

| | | | |
|---|---|---|---|
| 8,090,733 B2* | 1/2012 | Bayliss | G06F 16/215 |
| | | | 707/E17.069 |
| 10,148,709 B2 | 12/2018 | Boldyrev et al. | |
| 2010/0145958 A1 | 6/2010 | Duffy et al. | |
| 2012/0284090 A1 | 11/2012 | Marins et al. | |
| 2017/0228807 A1 | 8/2017 | Galindo | |
| 2019/0361933 A1* | 11/2019 | Rogynskyy | H04M 15/00 |
| 2020/0183911 A1 | 6/2020 | Patel et al. | |

FOREIGN PATENT DOCUMENTS

WO    2015/139119 A1    9/2015

OTHER PUBLICATIONS

Adelberg, Michael et al. "Improving Provider Directory Accuracy: Can Machine-Readable Directories Help?", The American Journal of Managed Care, vol. 25, Issue 5, May 15, 2019, (9 pages), [Retrieved from the Internet Dec. 9, 2021] <URL: https://www.ajmc.com/view/improving-provider-directory-accuracy-can-machinereadable-directories-help>.

(Continued)

*Primary Examiner* — Bai D Vu
(74) *Attorney, Agent, or Firm* — ALSTON & BIRD LLP

(57) ABSTRACT

Various embodiments of the present invention provide methods, apparatuses, systems, computing devices, computing entities, and/or the like for facilitating efficient and effective execution of database management operations. For example, various embodiments of the present invention provide methods, apparatuses, systems, computing devices, computing entities, and/or the like for facilitating efficient and effective execution of database management operations using distributed database update management techniques that utilize at least one of a field value temporal scoring machine learning model, total field utility measures, and distributed database update routines.

20 Claims, 13 Drawing Sheets

(56) References Cited

OTHER PUBLICATIONS

Culver, Kyle et al. "Crowdsourcing Healthcare Provider Directory Maintenance," Free The Data|A Case Study, Humana, Dec. 8, 2021, pp. 1-25, available online at https://vdocuments.mx/reader/full/crowdsourcing-healthcare-provider-directory-maintenance-crowdsourcing-healthcare.

Mazumdar, Suvodeep et al. "Harnessing Location-Based Services for Effective Citizen Observatories," International Journal of Spatial Data Infrastructures Research, vol. 13, Mar. 21, 2018, pp. 101-108, DOI: 10.2902/1725-0463.2018.13.art10.

Tong, Jennifer. "CAQH Develops Artificial Intelligence To Improve Provider Directory Accuracy: Technology Delivers Better Data, More Efficiently, With Less Provider Abrasion," PR Newswire, New York, Mar. 14, 2019, (2 pages), available online at https://dialog.proquest.com/professional/docview/2190952963/17D05BEE56E4A36505/17?accountid=157282.

* cited by examiner

| Field | Time elapsed since last Update | Likelihood of Change | Reward |
|---|---|---|---|
| Address | 360 days | High | 360 |
| Acquiring Network | 720 days | High | 720 |
| Phone Number | 250 days | High | 250 |
| Spouse | 180 days | Low (Static) | 70 |
| DNA | 720 days | Low (Static) | 0 |

FIG. 8

| Provider | Address | Phone Number | Accepting Patient |
|---|---|---|---|
| Dr. XYZ  1301 | 30/45 [Score - 66%] | 10/75 [Score - 13%] | 5/50 [Score - 10%] |
| Dr. ABC  1302 | 5/10 [Score - 50%] | 4/25 [Score - 16%] | 50/75 [Score - 73%] |

FIG. 13

DATABASE MANAGEMENT SYSTEMS USING DISTRIBUTED DATABASE UPDATE MANAGEMENT OPERATIONS

BACKGROUND

Various embodiments of the present invention address technical challenges related to performing efficient and effective execution of database management operations.

BRIEF SUMMARY

In general, various embodiments of the present invention provide methods, apparatuses, systems, computing devices, computing entities, and/or the like for facilitating efficient and effective execution of database management operations. For example, various embodiments of the present invention provide methods, apparatuses, systems, computing devices, computing entities, and/or the like for facilitating efficient and effective execution of database management operations using distributed database update management techniques that utilize at least one of a field value temporal scoring machine learning model, total field utility measures, and distributed database update routines.

In accordance with one aspect, a method includes: identifying a plurality of database field values for a database entity of a database, wherein each database field value is associated with a corresponding database field of a plurality of database field of the database; for each database field value, determining, using a field value temporal scoring machine learning model, and based at least in part on one or more field value feature values for the database field value, a per-field update utility measure for the database field value; determining, based at least in part on each per-field update utility measure, an update-eligible field value subset of the plurality of database field values, wherein each database field value in the update-eligible field value subset is associated with a corresponding per-field update utility measure that satisfies a per-field update utility measure threshold; determining, based at least in part on each per-field update utility measure for the update-eligible field value subset, a total update utility measure for the database entity; determining an update region for the database entity, where the update region is associated with a plurality of database update agent profiles; executing a plurality of distributed database update routines, wherein: (i) each distributed database update routine is associated with a corresponding database update agent profile and is configured to transmit a database validation query to an agent computing entity associated with the corresponding database update agent profile, (ii) each database validation query comprises a plurality of database validation sub-queries each describing a field value validation request for a corresponding database field value in the update-eligible field value subset, and (iii) each database validation query describes the total update utility measure for the database entity, subsequent to executing the one or more distributed database update routines, receiving a required number of database validation responses, wherein each database validation response is associated with a respective database update agent profile; for each database field value in the update-eligible field value subset, determining, based at least in part on each database validation response, a field value validity score; and performing one or more database management operations based at least in part on each field value validity score.

In accordance with another aspect, an apparatus comprising at least one processor and at least one memory including program code, the at least one memory and the program code configured to, with the processor, cause the apparatus to at least: identify a plurality of database field values for a database entity of a database, wherein each database field value is associated with a corresponding database field of a plurality of database field of the database; for each database field value, determine, using a field value temporal scoring machine learning model, and based at least in part on one or more field value feature values for the database field value, a per-field update utility measure for the database field value; determine, based at least in part on each per-field update utility measure, an update-eligible field value subset of the plurality of database field values, wherein each database field value in the update-eligible field value subset is associated with a corresponding per-field update utility measure that satisfies a per-field update utility measure threshold; determine, based at least in part on each per-field update utility measure for the update-eligible field value subset, a total update utility measure for the database entity; determine an update region for the database entity, where the update region is associated with a plurality of database update agent profiles; execute a plurality of distributed database update routines, wherein: (i) each distributed database update routine is associated with a corresponding database update agent profile and is configured to transmit a database validation query to an agent computing entity associated with the corresponding database update agent profile, (ii) each database validation query comprises a plurality of database validation sub-queries each describing a field value validation request for a corresponding database field value in the update-eligible field value subset, and (iii) each database validation query describes the total update utility measure for the database entity, subsequent to executing the one or more distributed database update routines, receive a required number of database validation responses, wherein each database validation response is associated with a respective database update agent profile; for each database field value in the update-eligible field value subset, determine, based at least in part on each database validation response, a field value validity score; and perform one or more database management operations based at least in part on each field value validity score.

In accordance with yet another aspect, a computer program product computer program comprising at least one non-transitory computer-readable storage medium having computer-readable program code portions stored therein, the computer-readable program code portions configured to: identify a segmentation-based hashing model, wherein the segmentation-based hashing model is configured to: identify a plurality of database field values for a database entity of a database, wherein each database field value is associated with a corresponding database field of a plurality of database field of the database; for each database field value, determine, using a field value temporal scoring machine learning model, and based at least in part on one or more field value feature values for the database field value, a per-field update utility measure for the database field value; determine, based at least in part on each per-field update utility measure, an update-eligible field value subset of the plurality of database field values, wherein each database field value in the update-eligible field value subset is associated with a corresponding per-field update utility measure that satisfies a per-field update utility measure threshold; determine, based at least in part on each per-field update utility measure for the update-eligible field value subset, a total update utility measure for the database entity; determine an update region for the database entity, where the update region is associated with a plurality of database update agent profiles; execute a plurality of distributed database update routines, wherein: (i) each distributed database update routine is associated with a corresponding database update agent profile and is configured to transmit a database validation query to an agent computing entity associated with the corresponding database update agent profile, (ii) each database validation query comprises a plurality of database validation sub-queries each describing a field value validation request for a corresponding database field value in the update-eligible field value subset, and (iii) each database validation query describes the total update utility measure for the database entity, subsequent to executing the one or more distributed database update routines, receive a required number of database validation responses, wherein each database validation response is associated with a respective database update agent profile; for each database field value in the update-eligible field value subset, determine, based at least in part on each database validation response, a field value validity score; and perform one or more database management operations based at least in part on each field value validity score.

BRIEF DESCRIPTION OF THE DRAWINGS

Figure 1:
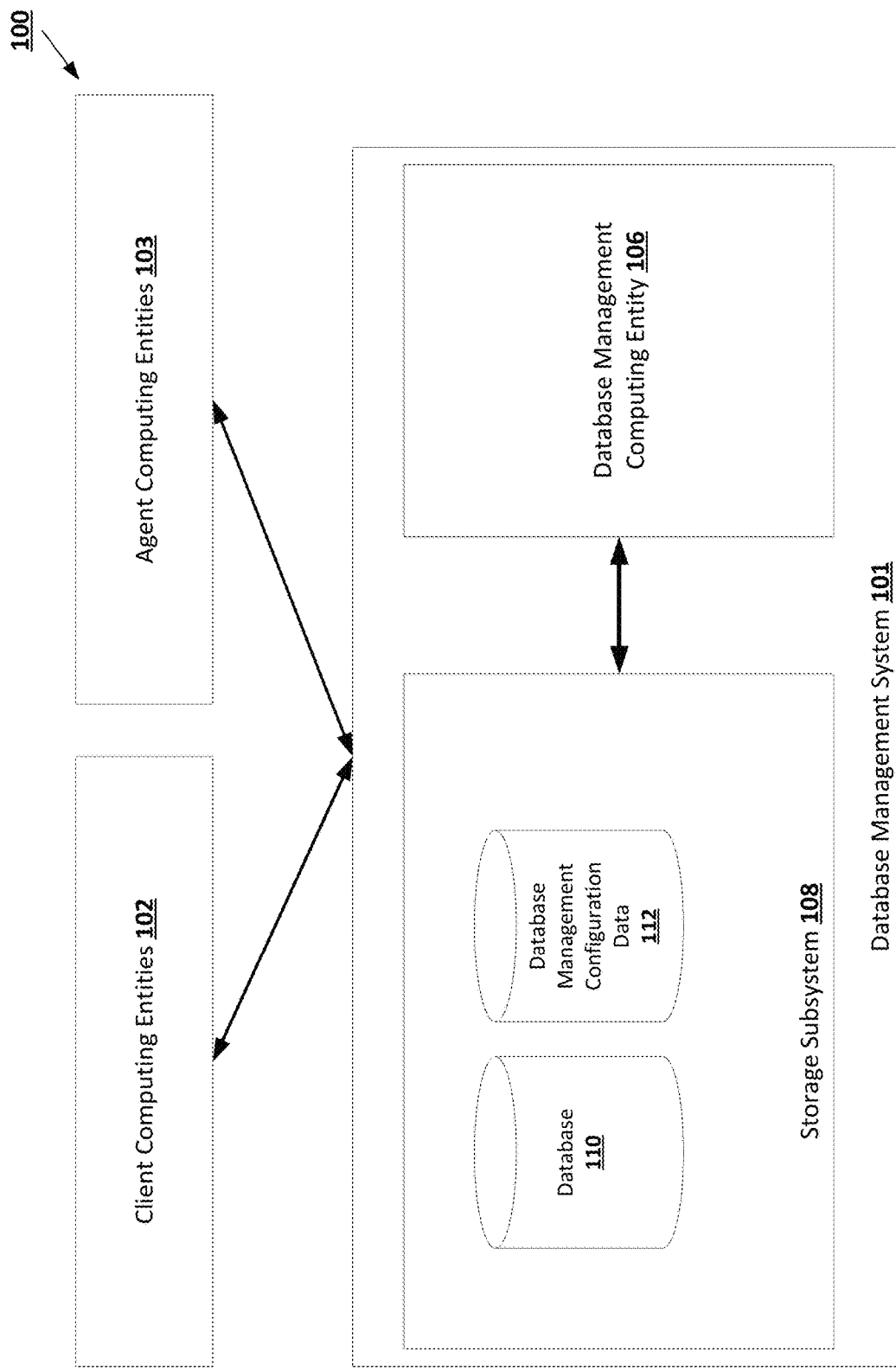

Having thus described the invention in general terms, reference will now be made to the accompanying drawings, which are not necessarily drawn to scale, and wherein:

FIG. 1 provides an exemplary overview of a system that can be used to practice embodiments of the present invention.

Figure 2:
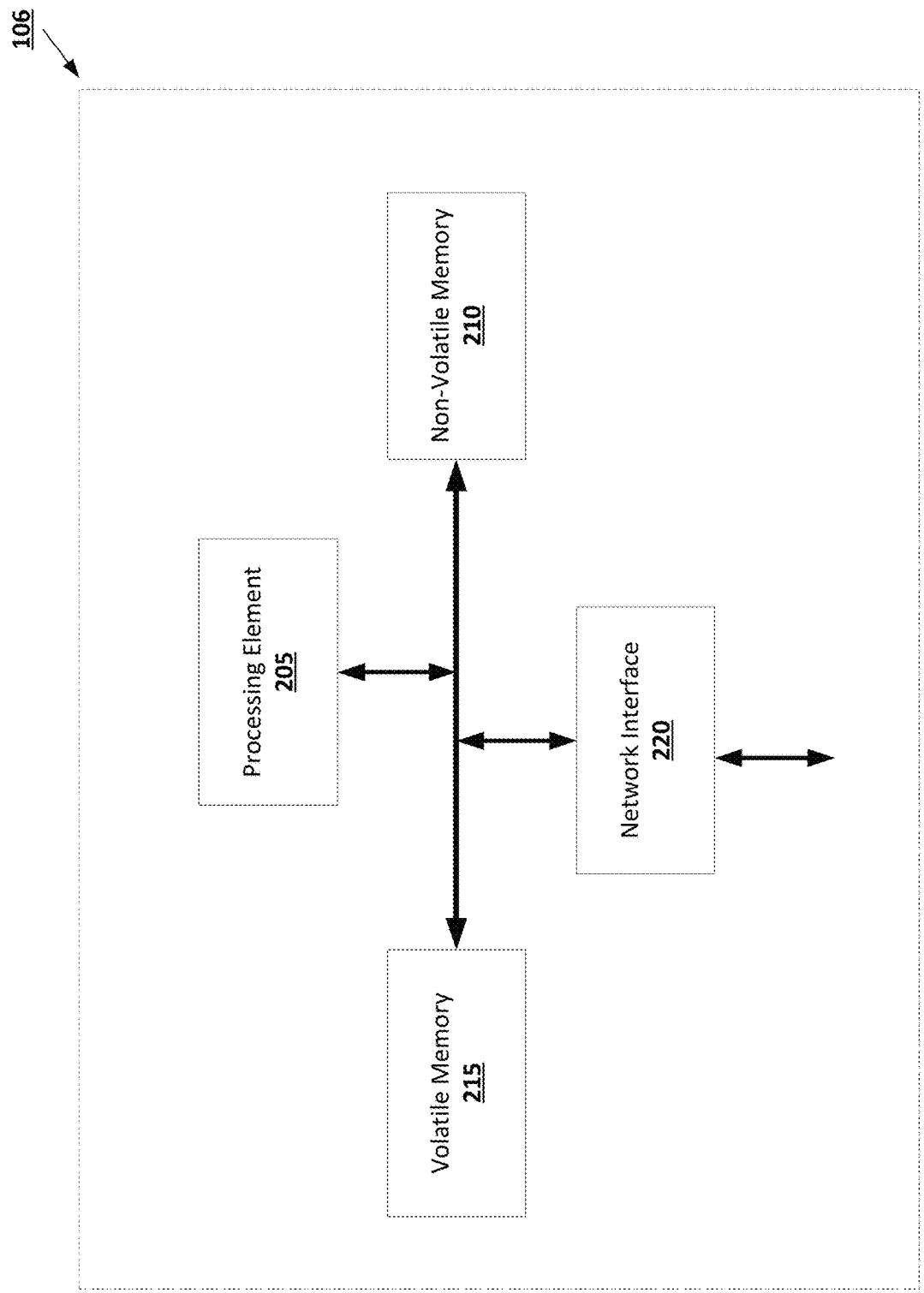

FIG. 2 provides an example database management computing entity in accordance with some embodiments discussed herein.

Figure 3:
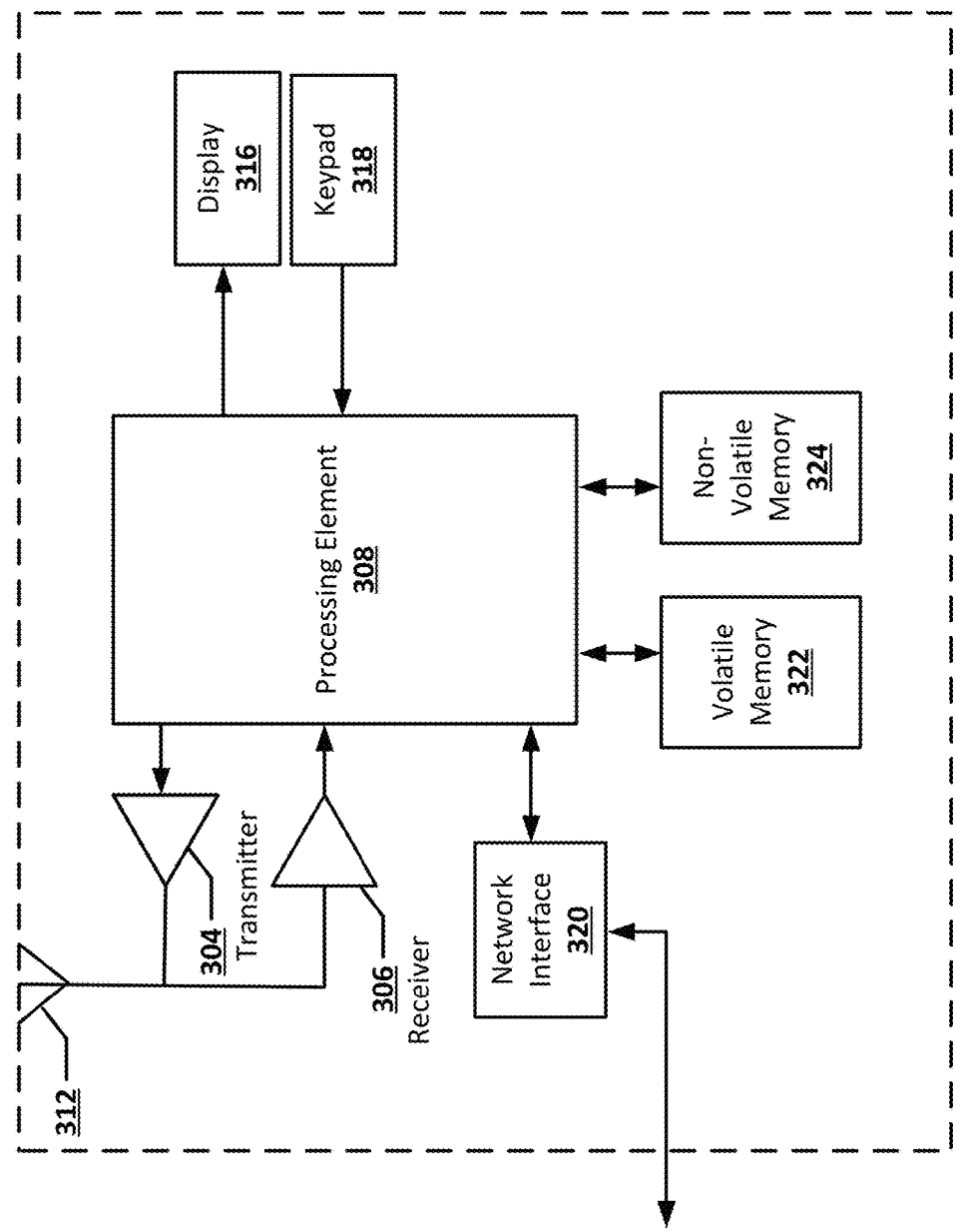

FIG. 3 provides an example client computing entity in accordance with some embodiments discussed herein.

Figure 4:
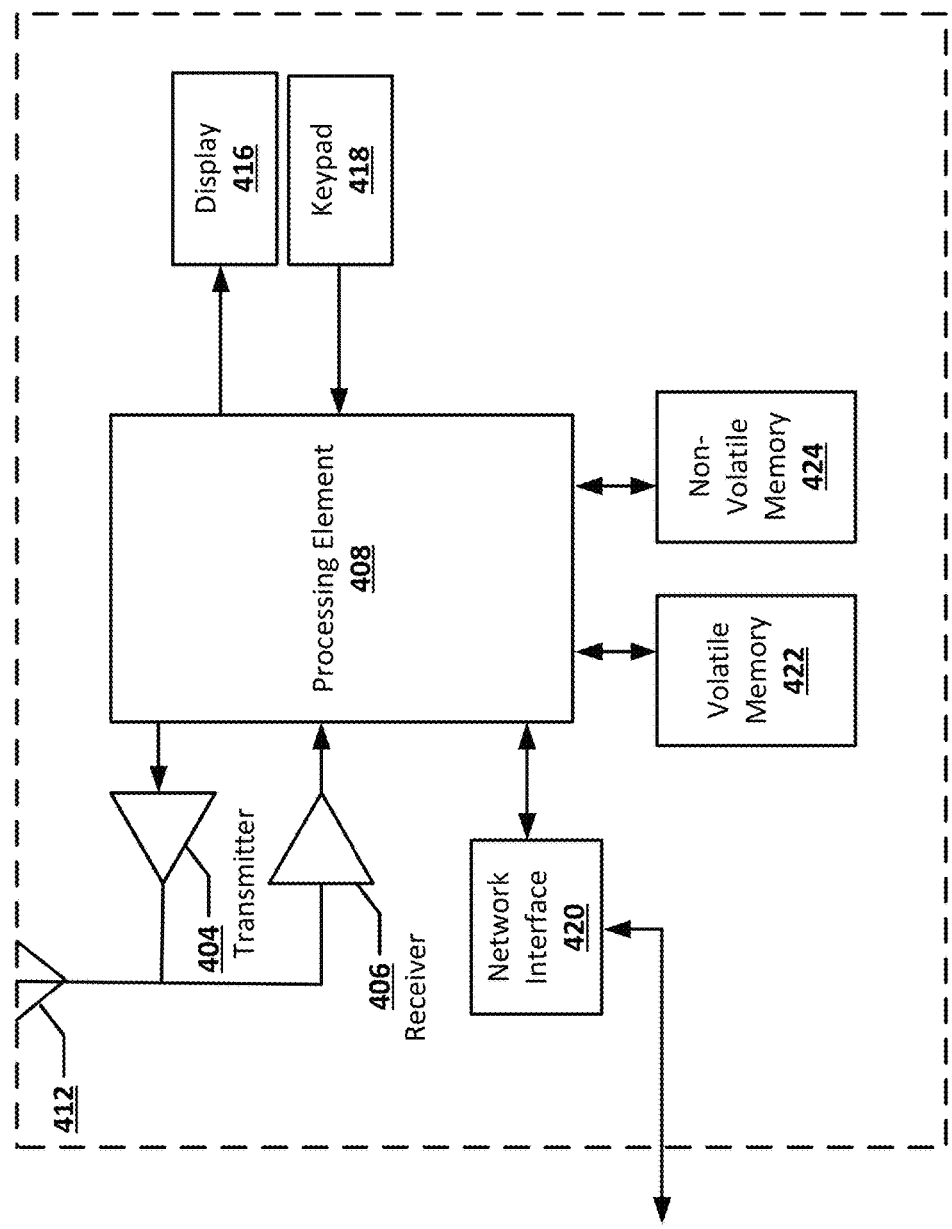

FIG. 4 provides an example agent computing entity in accordance with some embodiments discussed herein.

Figure 5:
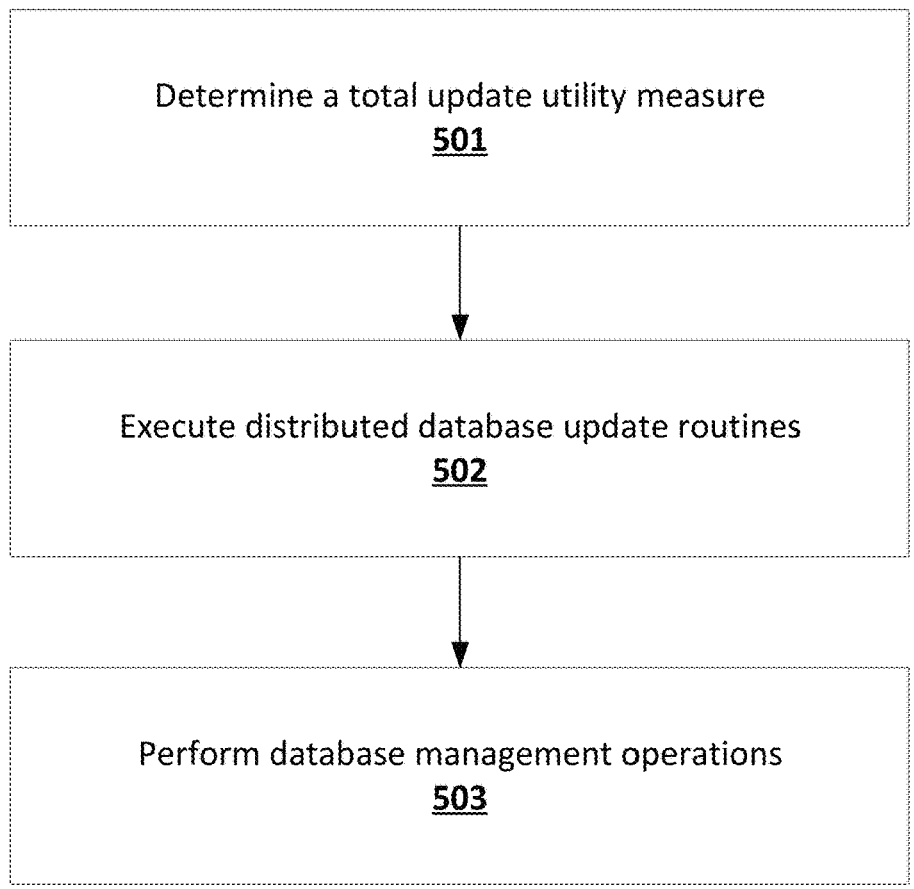

FIG. 5 is a flowchart diagram of an example process for performing distributed database update management for a database entity of a database in accordance with some embodiments discussed herein.

Figure 6:
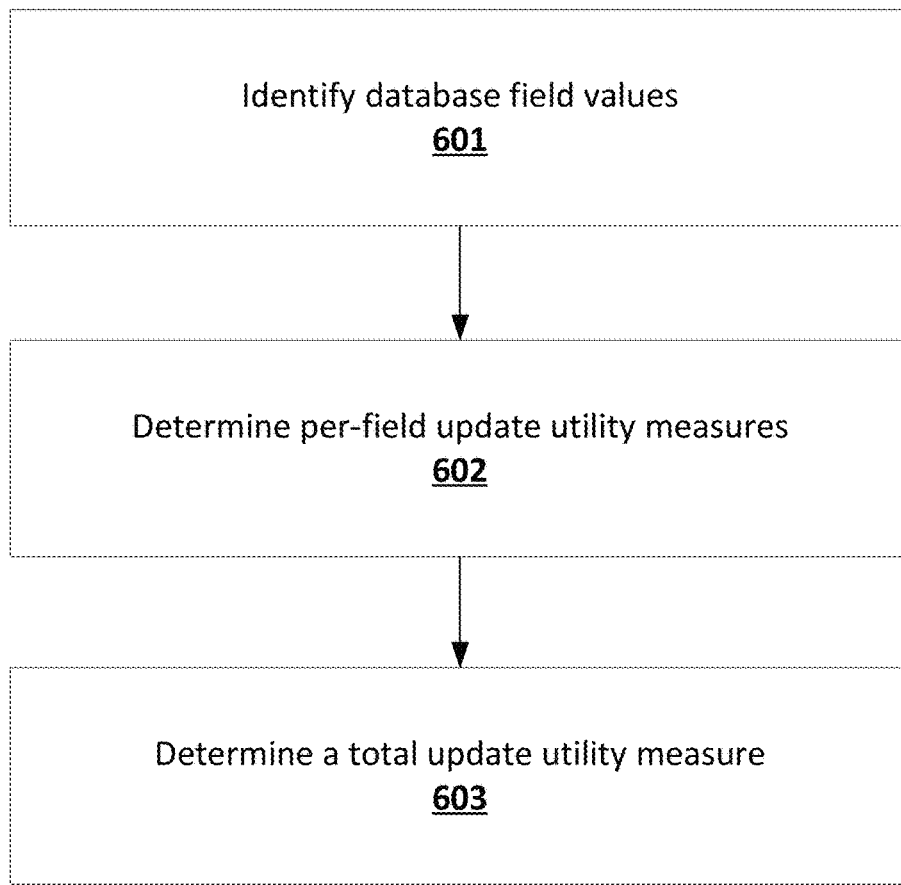

FIG. 6 is a flowchart diagram of an example process for determining a total update utility measure for a database entity of a database in accordance with some embodiments discussed herein.

Figure 7:
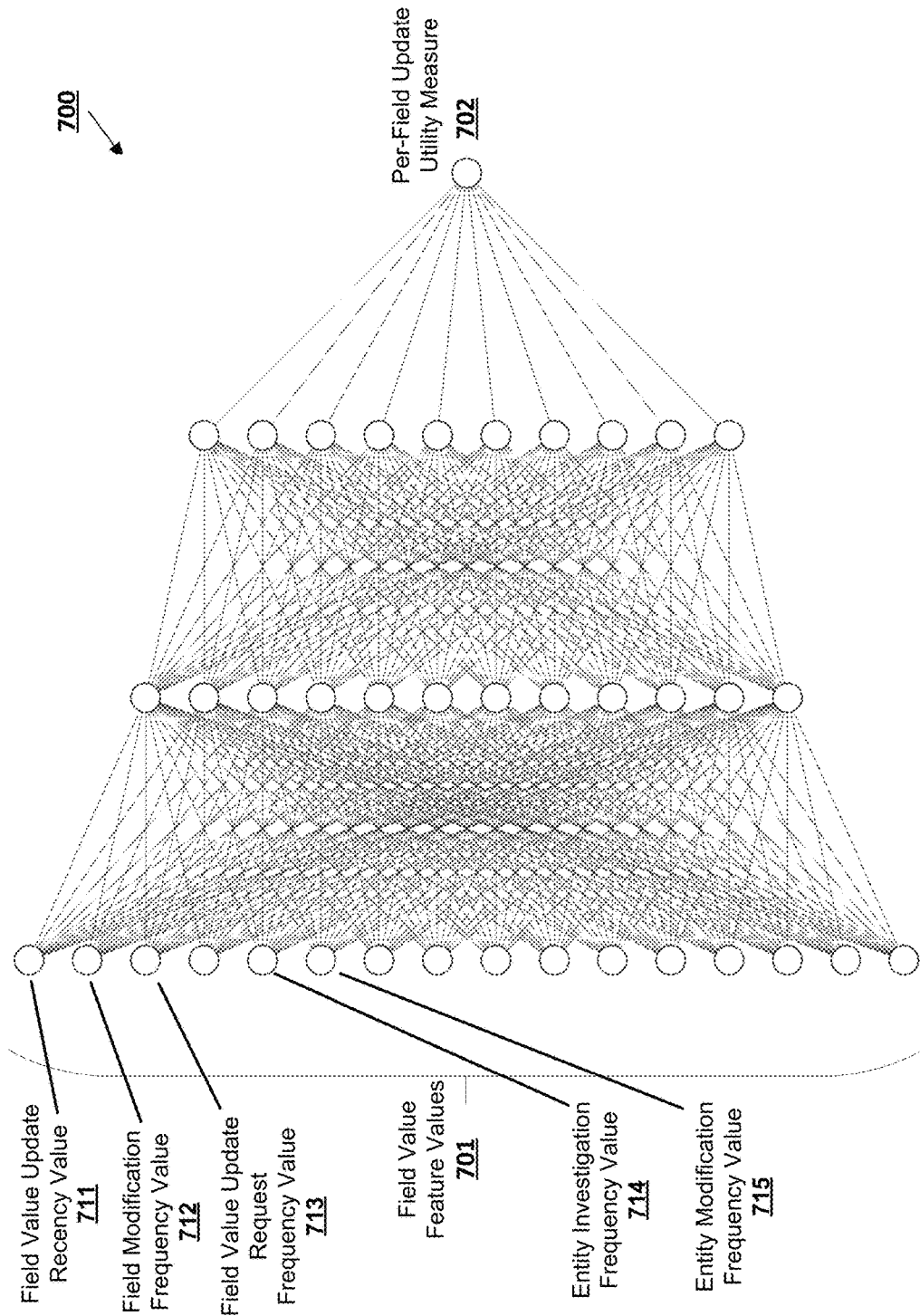

FIG. 7 provides an operational example of a field value temporal scoring machine learning model in accordance with some embodiments discussed herein.

FIG. 8 provides an operational example of data determined based at least in part on input features and output features of a field value temporal scoring machine learning model in accordance with some embodiments discussed herein.

Figure 9:
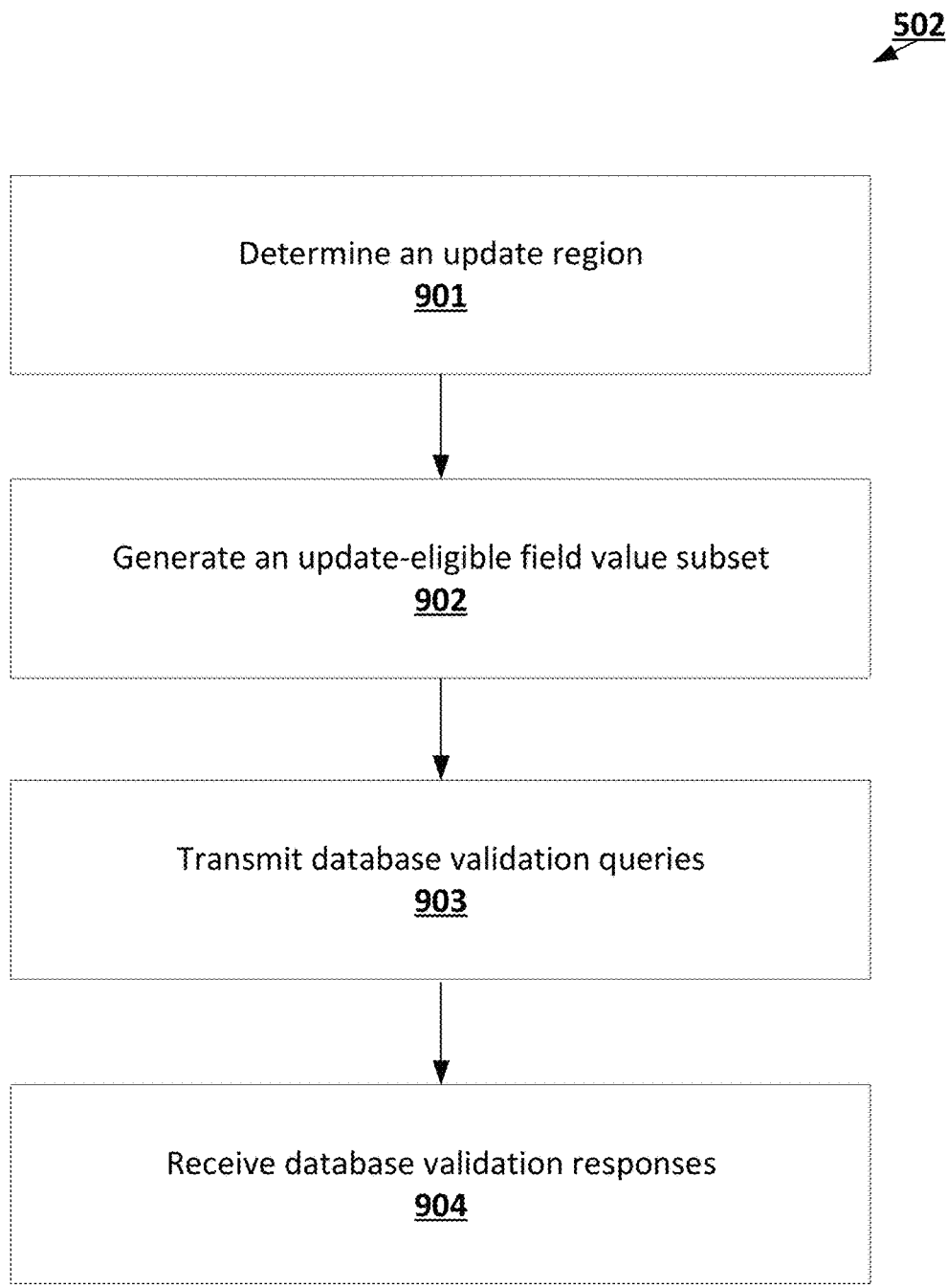

FIG. 9 is a flowchart diagram of an example process for performing P distributed database update routines with respect to a database entity in accordance with some embodiments discussed herein.

Figure 10:
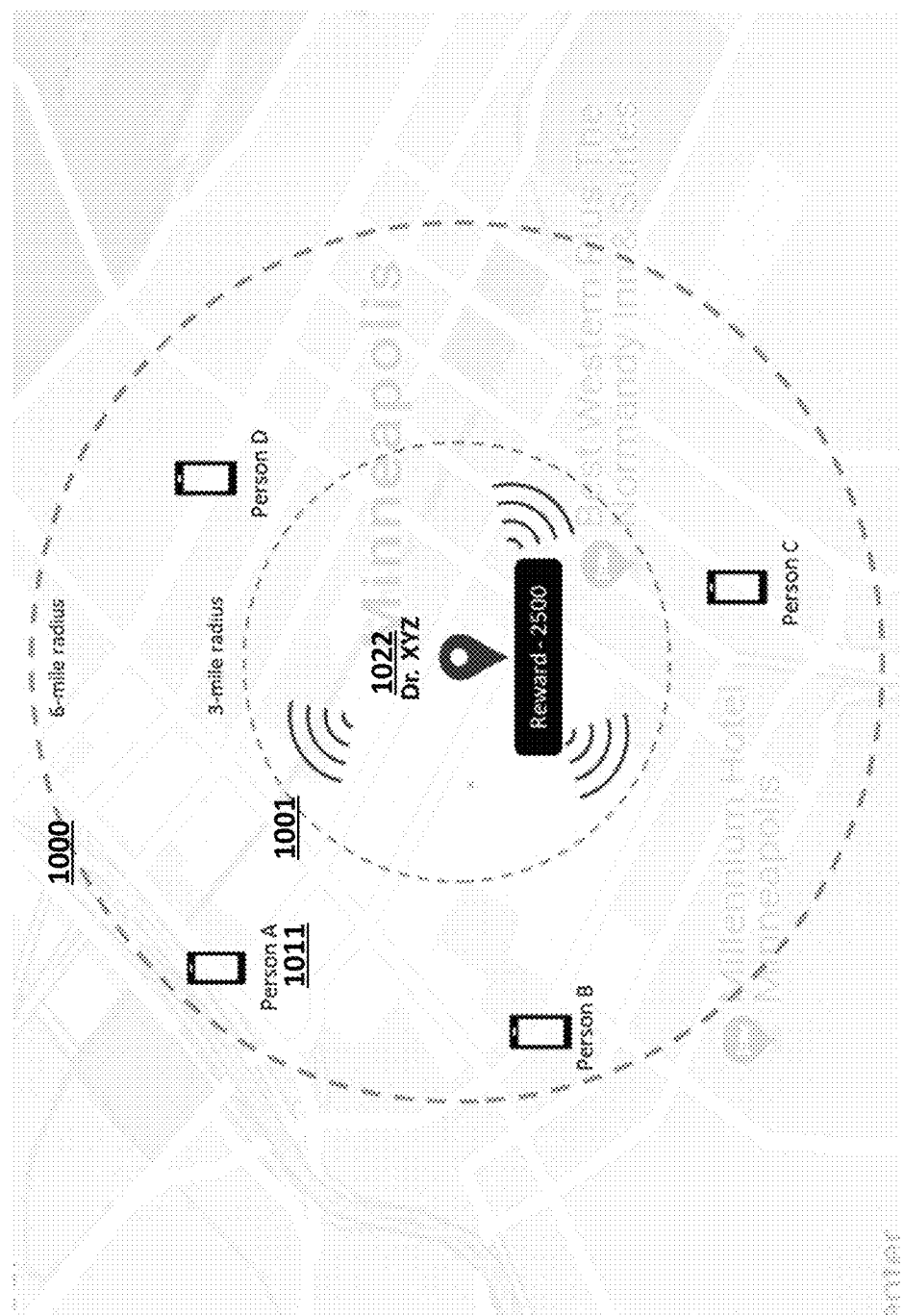

FIG. 10 provides an operational example of generating a database update region in accordance with some embodiments discussed herein.

Figure 11:
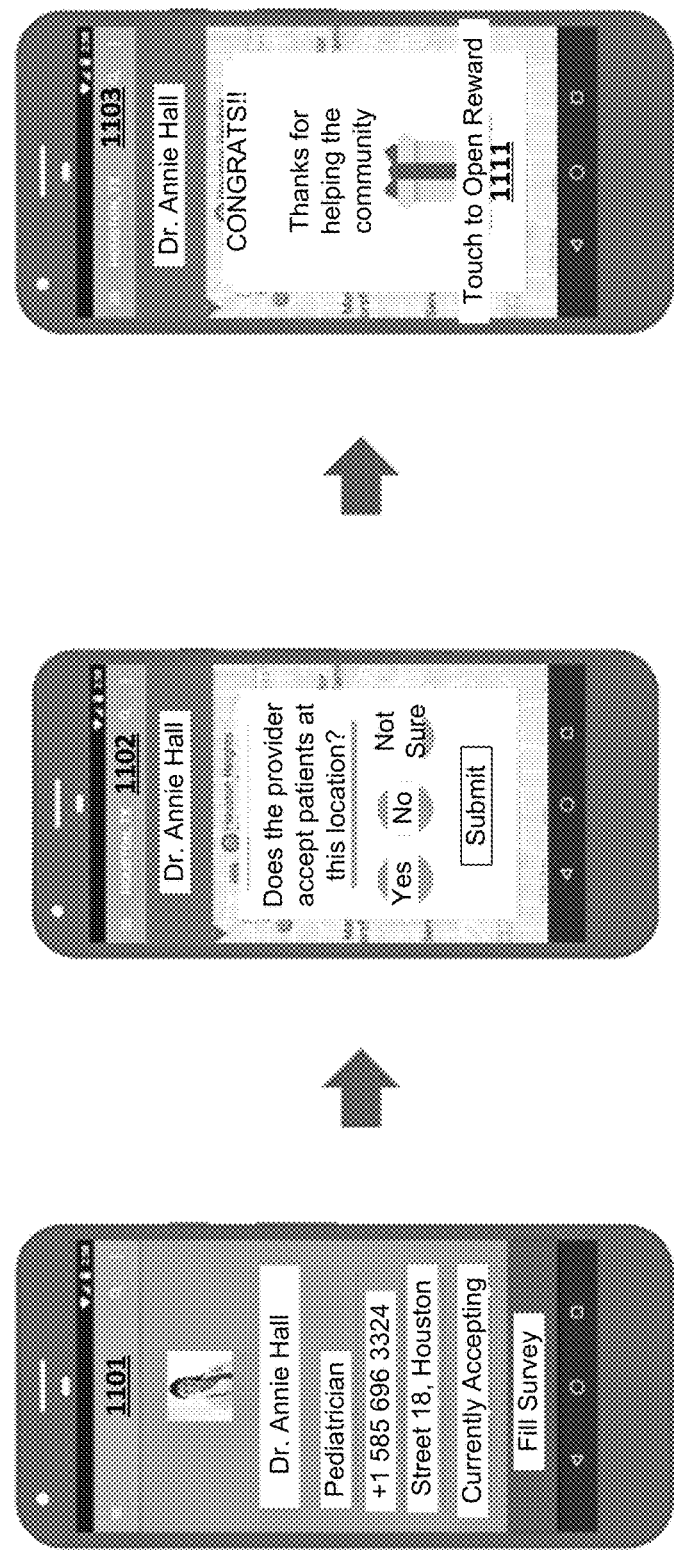

FIG. 11 provides an operational example of three user interfaces that are generated based at least in part on data described by a database validation query in accordance with some embodiments discussed herein.

Figure 12:
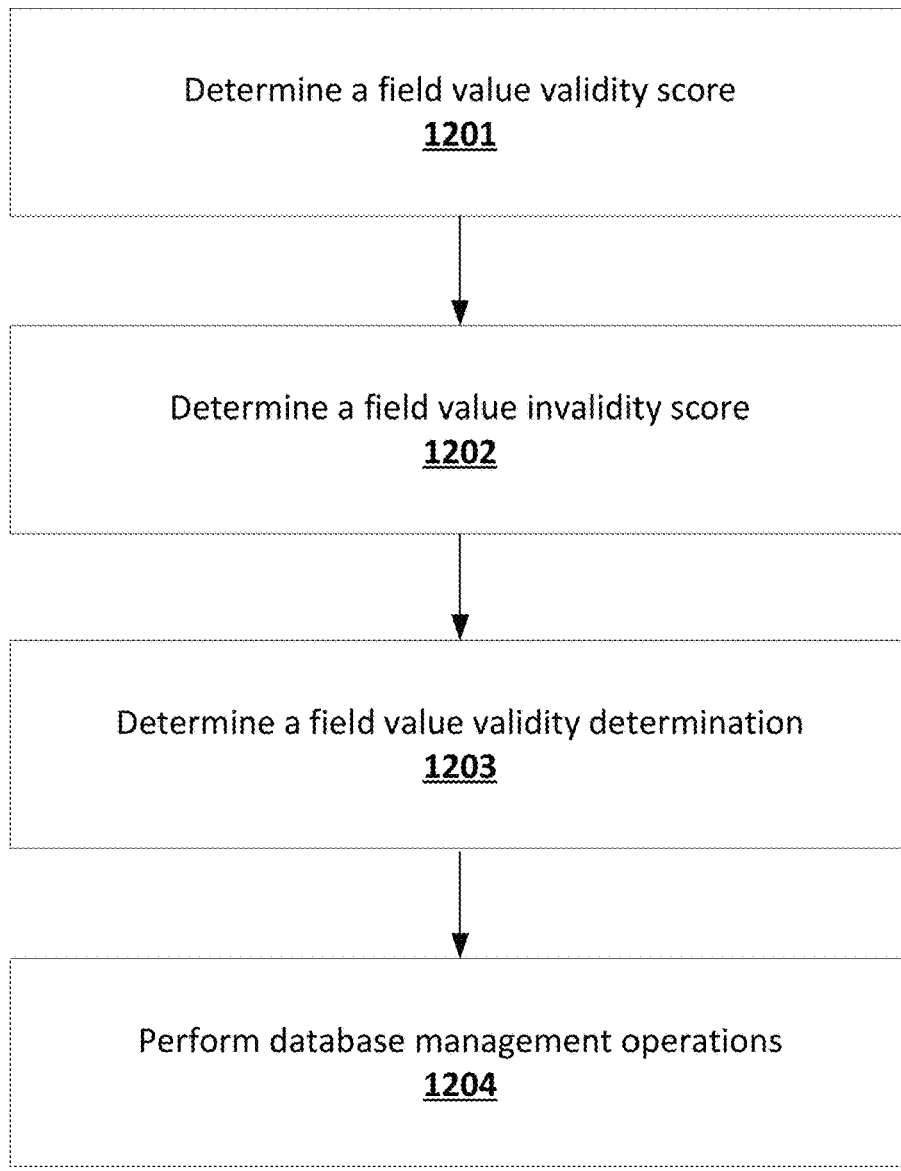

FIG. 12 is a flowchart diagram of an example process for determining the field value validity determination for a particular database field value that is in the update-eligible field value subset of a particular database entity in accordance with some embodiments discussed herein.

FIG. 13 provides an operational example of a database management operation output user interface in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL ADVANTAGES

Various embodiments of the present invention address technical challenges associated with decreasing operational load on database management systems by utilizing distributed database update management techniques to enhance accuracy/reliability of content data described by a database. When content data described by a database are inaccurate/unreliable, the number of user-initiated queries to the corresponding database management system increase over time, as users re-query the database management system to obtain updated content data, which in turn increases the operational load on the corresponding database management system thus threatening the operational integrity and effectiveness of the corresponding database management system. By disclosing techniques for increasing accuracy/reliability of content data described by a database using distributed database update management techniques, various embodiments of the present invention decrease operational load on database management systems via reducing user-initiated database queries. In this way, various embodiments of the present invention make important technical contributions to decreasing operational load on database management systems.

Various embodiments of the present invention make important technical contributions to improving resource-usage efficiency of database update systems by using field value validity determinations to set the number of allowed computing entities used by the noted database update systems and thus perform operational load balancing for the database update systems. For example, in some embodiments, a database management computing entity determines E field value validity determinations for E database entities. Then, the count of E database input entities that are associated with affirmative field value validity determinations, along with a resource utilization ratio for each database entity, can be used to predict a predicted number of computing entities needed to perform database update operations with respect to the E database entities. For example, in some embodiments, the number of computing entities needed to perform database update operations with respect to E database entities can be determined based at least in part on the output of the equation: $X=\text{ceil}(\Sigma_k^{k=K} ur_k)$, where X is the predicted number of computing entities needed to perform database update operations with respect to the E database entities, $\text{ceil}(\cdot)$ is a ceiling function that returns the closest integer that is greater than or equal to the value provided as the input parameter of the ceiling function, k is an index variable that iterates over K database entities among the E database entities that are associated with affirmative field value validity determinations, and $ur_k$ is the estimated resource utilization ratio for a kth database entity that may be determined based at least in part on a size of the kth database entity. In some embodiments, once X is generated, a database management computing entity can use X to perform operational load balancing for a server system that is configured to perform database management operations (e.g., automated investigation operations) with respect to E database entities. This may be done by allocating computing entities to the database update operations if the number of currently-allocated computing entities is below X, and deallocating currently-allocated computing entities if the number of currently-allocated computing entities is above X.

An exemplary application of various embodiments of the present invention may relate to facilitating the operations of a Prosocial system. The ProSocial system may identify one or more fields within a directory which are most likely to be associated with erroneous (e.g., outdate, inaccurate, etc.) data. For example, the ProSocial system may determine a time elapsed since the field was last updated by comparing a timestamp associated with the time the field was last updated and a current timestamp. Each field may be assigned a likelihood of change category indicative of the probability that the field has changed during an elapsed time. The likelihood of change categories may include a high likelihood of change category, a medium likelihood of change category, and a low likelihood of change category. Alternatively, the ProSocial system may determine and assign one or more fields of a directory based at least in part on claim rework heuristic data such that providers associated with significantly higher claim rework rates as compared to other providers may be associated with directory fields deemed most likely to be erroneous. As another alternative, the ProSocial system may determine and assign one or more fields of a directory based at least in part on call rate heuristics such that providers associated with higher normalized call volumes (i.e., number of calls normalized with claim volume) as compared to other providers may be associated with directory fields deemed most likely to be erroneous. As yet another alternative, the ProSocial system may determine and assign one or more fields of a directory based at least in part on provider demographic update frequency heuristics such that providers associated with significantly higher or lower demographic and/or contractual updates as compared to other providers may be associated with directory fields deemed most likely to be erroneous.

In some embodiments, each field within a directory may then be assigned a reward point value indicative of the number of reward points associated with updating and/or validating the data within the particular field. The reward point value may be based at least in part on the identified likelihood of change associated with the field. The reward point value may also be based at least in part on the time elapsed since the field was last updated. The ProSocial system may then determine one or more geofencing boundaries, which may be defined as the radius from a corresponding address associated with the directory of interest. Candidate users are then identified within the one or more boundaries and may receive a data collection data object on a corresponding user device, such as via a push notification, email, short message service, in-app notification, etc. The data collection data object may alert the users to an opportunity to earn reward points by sharing his/her feedback regarding the provider corresponding to the directory of interest. The data collection data object may include one or more reward incentives, which may be redeemed by the user. Such reward incentives may include monetary incentives, an increase in an associated social ranking within the ProSocial system, gift cards, coupons, and/or the like.

In the instance where a user is interested and chooses to interact with the data collection data object, the data collection data object may provide one or more user interactable fields with which a user may interact with to confirm, deny, modify, and/or the like the existing data fields in the directory for the provider. For example, the data collection data object may include a user questionnaire for a particular provider. For each completed field, the user may earn the corresponding reward points.

Once the user has submitted the data collection data object, the ProSocial system may then receive a data collection response data object containing the information entered by the user. For example, the data collection response data object may contain a questionnaire as completed by the user. Once a user has completed interaction the data collection data object and/or upon receipt of the data collection response data object, the ProSocial system may generate and provide a reward notification to a user. The reward notification may notify the user that the one or more incentives offered to the user have been applied to the user's account. For example, a reward notification for an incentive of a monetary reward may inform the user that funds have been applied to a user financial account, sent as a gift card, etc. The reward incentive earned may depend on the number of reward points accumulated during the completion of the particular data collection data object and/or the completion of the previous data collection data object.

The ProSocial system may receive a plurality of data collection response data objects from a plurality of user devices and may combine each data field response from the one or more data collection response data objects to determine a data field confidence score for each current data field value. In an instance a data field score fails to satisfy one or more data field score thresholds, the current data field value may be determined to be incorrect. For example, if 5 out of 50 data collection data objects confirmed a data field value of "true" for an "accepting patients" data field for a provider XYZ, the ProSocial system may determine a data field score of 10%. As such, assuming for instance a data field score threshold value of 50%, the data field value of "true" for an "accepting patients" data field for a provider XYZ may be determined to be incorrect. In some embodiments, user responses are weighted based at least in part on social ranking parameters associated with the users.

II. DEFINITIONS OF CERTAIN TERMS

The term "database" may refer to a data construct that is configured to describe a collection of one or more structured data values that are stored in accordance with one or more data models. Examples of databases include a collection of one or more structured data values, such as one or more structured data values stored in accordance with a relational data model, one or more structured data values stored in accordance with an object-oriented data model, one or more structured data values stored in accordance with an object-relational data model, one or more structured data values stored in accordance with a hierarchical data model, one or more structured data values stored in accordance with a graph-based data model, and/or the like. In some embodiments, the structured data values of a database are stored on one computing entity. In some embodiments, the structured data values of a database are stored on multiple computing entities. In some embodiments, a database is associated with a set of database entities and comprises a set of database field values, as further described below. An example of a database is a provider directory database.

The term "database entity" may refer to a data construct that is configured to describe a collection of structured data values described by a database that all collectively relate to a defined real-world entity and/or a defined virtual entity. For example, in some embodiments, when the database is a provider directory database, a database entity may be a collection of structured data values that relate to a particular provider entity. In some of the noted exemplary embodiments, a database entity associated with the particular provider entity may describe a collection of structured data values that include one or more of: a first name associated with the particular provider entity, a last name associated with the particular provider entity, a street address associated with the particular provider entity, a city associated with the particular provider entity, a state associated with the particular provider entity, a zip code associated with the particular provider entity, an address type for each address associated with the particular provider entity, a phone number associated with the particular provider entity, a fax number associated with the particular provider entity, a structured data value describing whether the particular provider entity accepts new patients, a specialty designation associated with the particular provider entity, one or more demographic attributes associated with the particular provider entity, and/or the like. In some embodiments, each structured data value of a database entity is referred to herein as a database field value, while each structured data type of a structured data value is referred to herein as a database field. For example, when a particular provider entity is associated with a structured data value that describes a first name of the particular provider entity as "Jack," the particular provider entity may be associated with a database field value of "Jack" that is associated with a first name database field. Accordingly, in some embodiments, each database entity is associated with a set of F database field values, where each database field value of the set of database field values is associated with a database field of F database fields, with the F database fields being defined by a schema of the underlying database associated with the database entities.

The term "database field value" may refer to a data construct that is configured to describe an atomic feature of a corresponding database entity as described by the underlying database. For example, a database entity associated with the particular provider entity may be associated with the following database field values: a first name associated with the particular provider entity, a last name associated with the particular provider entity, a street address associated with the particular provider entity, a city associated with the particular provider entity, a state associated with the particular provider entity, a zip code associated with the particular provider entity, an address type for each address associated with the particular provider entity, a phone number associated with the particular provider entity, a fax number associated with the particular provider entity, a structured data value describing whether the particular provider entity accepts new patients, a specialty designation associated with the particular provider entity, one or more demographic attributes associated with the particular provider entity, and/or the like. In some embodiments, each structured data value of a database entity is referred to herein as a database field value, while each structured data type of a structured data value is referred to herein as a database field. In some embodiments, each database field value of the F database field values associated with a database entity is associated with a distinct database field of F database fields, with the F database fields being defined by a schema of the underlying database associated with the database entities.

The term "per-field update utility measure" may refer to a data construct that is configured to describe an estimated likelihood that updating a corresponding database field value will be integral to maintaining the database that comprises the corresponding database field value with the most up-to-date content. Accordingly, in some embodiments, the per-field update utility measure of a corresponding database field value that is associated with a particular database field may depend at least in part on the likelihood that database field values associated with the particular database field change as well as the last time the corresponding database field value is updated. For example, in some embodiments, the per-field update utility measure of a database field value that describes the value "John" for a first name database field value may depend on: (i) how often do first name database field values change, and (ii) the last time the database field value was updated (e.g., was modified to reflect a new value if the update value differed relative to an existing value or was maintained with the existing value if the update value did not differ relative to the existing value). In some embodiments, the per-update utility measure for a corresponding database field value is determined based at least in part on the output of processing one or more field value feature values for the corresponding database field value using a field value temporal scoring machine learning model.

The term "field value temporal scoring machine learning model" may refer to a data construct that is configured to describe parameters, hyper-parameters, and/or defined operations of a machine learning model, where the machine learning model is configured to process one or more field value feature values for a corresponding database field value to generate the per-field update utility measure for the corresponding database field value. Examples of field value feature values for a particular database field value include a field value update recency value for the particular database field value, a field modification frequency value for the corresponding database field, a field value update request frequency value for the particular database field value, and/or the like. In some embodiments, the field value temporal scoring machine learning model comprises a defined number of feedforward neural network layers that are collectively configured to process one or more field value feature values for a corresponding database field value to generate the per-field update utility measure for the corresponding database field value. In some embodiments, the field value temporal scoring machine learning model is trained based at least in part on recorded historical ground-truth labels/scores describing per-field update utility measures for database field values of a database in the past. In some embodiments, during each inferential iteration, the inputs to the field value temporal scoring machine learning model include a vector describing the field value feature values of an input database field value, while outputs of the field value temporal scoring machine learning model include a vector and/or an atomic value describing the per-field update utility measure for the noted input database field value.

The term "field value update recency value" may refer to a data construct that is configured to describe a length of time (e.g., expressed in units of time) between a latest update of a corresponding database field value and a current time. For example, if a particular database field value is last updated 180 days ago, the field value update recency value for the particular database field value may describe the value of 180 and/or a discrete label associated with the value of 180. In some embodiments, given a set of database field values (e.g., given F*E database field values stored using a database that is associated with F database fields and E database entities), the update recency values for the noted database field values are normalized across the set of database field values to generate the field value update recency scores for the database field values, and the field value update recency values for the database field values are then generated based at least in part on the noted field value update recency scores for the database field values.

The term "field modification frequency value" may refer to a data construct that is configured to describe an estimated/computed likelihood that database field values associated with a corresponding database field change (i.e., be modified from a first value to a second value) in the future. For example, if the field modification frequency value for an address database field is higher than the field modification frequency value for a first name database field, this relationship may describe that address database field values are more likely to change than first name database field values. In some embodiments, given a set of F database fields as defined by the schema of a database, for each database field, a modification count is computed that describes the number of times that updates of database fields values associated with the database field have detected that the database fields values have changed in a defined historical period (e.g., in the last year). For example, given a database that is associated with two database entities, the modification count for a first name database field may describe the number of times the first name of the first database entity has been detected to have changed plus the number of times the first name of the second database entity has been detected to have changed. In some embodiments, once modification counts are computed for all of the database fields defined by the schema of a database, then those modification counts are normalized across the database fields to generate the normalized modification counts. In some embodiments, the field modification frequency values are then determined based at least in part on the normalized modification counts. For example, the normalized modification counts computed for all of the database fields defined by the schema of a database may be separated into a set of predefined buckets (e.g., a "High" bucket, a "Low" bucket, and a "Medium" bucket), and then the field modification frequency value for each database field may be determined based at least in part on the bucket in which the normalized modification count for the database field falls. In some embodiments, modification counts computed for all of the database fields defined by the schema of a database may be separated into a set of predefined buckets (e.g., a "High" bucket, a "Low" bucket, and a "Medium" bucket), and then the field modification frequency value for each database field may be determined based at least in part on the bucket in which the modification count for the database field falls.

The term "field value update request frequency value" may refer to a data construct that is configured to describe an estimated number of update requests for a corresponding database field value during a defined historical period (e.g., in the last year). For example, in some embodiments, the field value update request frequency value for a particular database field value describes a rate of requests for obtaining updated values for a database field value associated with a particular database entity as a share of all of the requests for obtaining updated values for all of the database field values associated with the particular database entity (e.g., a ratio of calls related to the address of a provider database entity to calls related to all of the feature data associated with the provider database entity). In an exemplary embodiments, if a database entity is associated with a first database field value $V_1$ that is associated with five historical update requests, a second database field value $V_2$ that is associated with six historical update requests, and a third database field value $V_3$ that is associated with seven historical update requests, then the field value update request frequency value for $V_1$ is determined based at least in part on 5/(5+6+7), the field value update request frequency value for $V_2$ is determined based at least in part on 6/(5+6+7), and the field value update request frequency value for $V_3$ is determined based at least in part on 7/(5+6+7).

The term "entity investigation frequency value" may refer to a data construct that is configured to describe a ratio of monitored data entries (e.g., monitored claim data entries) associated with a particular database entity (e.g., a particular provider database entity) that have gone through investigation/rework operations during a defined historical period and/or satisfy investigation/rework heuristics. For example, the entity investigation frequency value for a provider database entity may describe a ratio of claim data entries associated with the provider database entity that have gone through claim rework processes during a defined historical period and/or satisfy investigation/rework heuristics. In some embodiments, the entity investigation frequency value for a provider database entity is a Boolean feature that describes whether the provider claim rework rate for a particular provider database entity is significantly higher than an average provider claim rework rate across all of the E provider database entities of a provider directory database.

The term "entity modification frequency value" may refer to a data construct that is configured to describe an estimated/computed likelihood that database field values (e.g., demographic feature values, contractual feature values, and/or the like) associated with a corresponding database entity change in the future. For example, if the field modification frequency value for a first provider database entity is higher than the field modification frequency value for a second provider database entity, this relationship may describe that database field values of the first provider database entity are more likely to change than database field values of the second provider database entity. In some embodiments, given a set of E entities of a database, for each database entity, a modification count is computed that describes the number of times that updates of database fields values associated with the database entity have detected that the database fields values have changed in a defined historical period (e.g., in the last year). For example, given a database that is associated with a first name database field and a last name database field, the modification count for a database entity may describe the number of times the first name of the first database entity has been detected to have changed plus the number of times the last name of the second database entity has been detected to have changed. In some embodiments, once modification counts are computed for all of the database entities associated with a database, then those modification counts are normalized across the database entities to generate the normalized modification counts. In some embodiments, the entity modification frequency values are then determined based at least in part on the normalized modification counts. For example, the normalized modification counts computed for all of the database entities may be separated into a set of predefined buckets (e.g., a "High" bucket, a "Low" bucket, and a "Medium" bucket), and then the entity modification frequency value for each database entity may be determined based at least in part on the bucket in which the normalized modification count for the database entity falls. In some embodiments, modification counts computed for all of the database entities defined by the schema of a database may be separated into a set of predefined buckets (e.g., a "High" bucket, a "Low" bucket, and a "Medium" bucket), and then the entity modification frequency value for each database entity may be determined based at least in part on the bucket in which the modification count for the database entity falls.

The term "distributed database update routine" may refer to a data construct that is configured to describe a set of computer-implemented operations that are configured to transmit P database validation queries to P agent computing entities associated with P database update agent profiles, where the P database update agent profiles are associated with a corresponding database entity and may be determined based at least in part on an update region for the corresponding database entity. In some embodiments, each distributed database update routine is associated with a corresponding database update agent profile and is configured to transmit a database validation query to an agent computing entity associated with a corresponding database update agent profile, each database validation query comprises a plurality of database validation sub-queries each describing a corresponding database field value in an update-eligible field value subset for a corresponding database entity, and each database validation query describes the total update utility measure for the corresponding database entity (e.g., as a reward measure for the database update agent profile, such as a reward measure presented within a gamification environment). In some embodiments, upon receiving a database validation response from a database update agent profile in response to a database validation query transmitted to an agent computing entity of the database update agent profile, an agent reward score for the database update agent profile (e.g., that may be used to provide proportional financial and/or in-game rewards to the database update agent profile) may be updated based at least in part on the total update utility measure for the database entity that is associated with the database validation query.

The term "update region" may refer to a data construct that is configured to describe a geographic region comprising the geographic location designators for a set of P database update agent profiles. In some embodiments, the geographic region is a circular region around a geographic location designator for a database entity (e.g., a geographic location designator of an office location of a provider database entity), where the radius of the circular region is determined at least in part in a manner configured to ensure that P update agent profiles are associated with geographic location designators that fall within the circular region. In some of the noted embodiments, P is a required agent count hyperparameter that describes the required count of update agent profiles to which distributed database update routines related to a particular database entity are transmitted. In some embodiments, the P value for a database entity is determined based at least in part on the total update utility measure for the database entity. In some embodiments, given a database entity that is associated with a particular total update utility measure, a P value for the database entity is determined based at least in part on processing the total update utility measure using a model (e.g., a trained linear regression machine learning model) that is configured to map the total update utility measure for a database entity to a required agent count hyperparameter for the database entity that describes the required count of update agent profiles to which distributed database update routines related to a particular database entity are transmitted. In some embodiments, after determining the P value for a database entity, the P value is mapped (e.g., using another trained linear regression model) to coordinate values (e.g., a radius value) for the database update region associated with the database entity using a model that is configured to map (e.g., based at least in part on the agent location density within an overall geographic region of a geographic location designator for a database entity) the P value for the database entity to the coordinate values for the database update region associated with the database entity. For example, the described model may map (e.g., based at least in part on the agent location density within an overall geographic region of a geographic location designator for a database entity) the P value for the database entity to the a radius value for a circular database update region associated with the database entity that has its centroid point at the geographic location designator for the database entity.

The term "update-eligible field value subset" may refer to a data construct that is configured to describe each database field value of a corresponding database entity whose respective per-field utility measure satisfies (e.g., exceeds, exceeds or is equal to, and/or the like) a per-field update utility measure threshold (e.g., a per-field update utility measure threshold of zero, a per-field update utility measure threshold determined based at least in part on a distribution of per-field update utility measure thresholds for all of the database field values associated with the database entity, and/or the like). In some embodiments, given a database entity associated with F database field values that are in turn associated with F corresponding per-field update utility measures, if the corresponding per-field update utility measure for a particular database field value satisfies a per-field update utility measure threshold, then the particular database field value is included within the update-eligible field value subset for the target database entity The term "database validation query" may refer to a data construct that is configured to describe a message transmitted by a database management computing entity to an agent computing entity for a database update agent profile whose geographic location designator is in the update region for a corresponding database entry, where the message: (i) comprises a plurality of database validation sub-queries each describing a field value validation request (i.e., a request for validation of) a corresponding database field value in the update-eligible field value subset for the corresponding database entity, and (ii) describes the total update utility measure for the corresponding database entity (e.g., describes the total update utility measure for the corresponding database entity as a reward measure in a gamification environment). In some embodiments, each database update agent profile is a user profile (e.g., a user profile associated with a registered member of a collaborative software platform associated with a database management computing entity) that is associated with a geographic location designator (e.g., a home geographic location designator, a real-time geographic location designator such as a real-time geographic location designator determined using Global Positioning Sensor data, and/or the like). In some embodiments, if the geographic location designator for a database update agent profile is within an update region of a database entity and/or if the database update agent profile is selected as one of the P database update agent profiles for a database entity, then a database validation query is transmitted to an agent computing entity 103 associated with the particular database update agent profile (e.g., a smartphone computing entity associated with a particular member whose home location is within the target update region). Accordingly, given P database update agent profiles associated with a database entity, P database validation queries may be transmitted to the P agent computing entities associated with the noted P database update agent profiles. Each of the P database validation queries may include S database validation sub-queries associated with the S database field values in the update-eligible subset for the noted database entity.

The term "database validation sub-query" may refer to a data construct that is configured to describe a request for validation of a database field value that is transmitted as part of a database validation query to an agent computing entity associated with a database update agent profiles. In some embodiments, given a database entity that is associated with a set of database update agent profiles including a database update agent profile $P_1$ that is associated with an agent computing entity $D_1$, and further given that the database entity is associated with three database field values $V_1$, $V_2$, and $V_3$ in the update-eligible field value subset for the database entity, a database validation query comprising three database validation sub-queries may be generated: a database validation sub-query that describes a validation request for $V_1$, a database validation sub-query that describes a validation request for $V_2$, and a database validation sub-query that describes a validation request for $V_3$. In some embodiments, a validation request asks the database update agent profiles to confirm if the existing value for a corresponding database field value is accurate (e.g., if the existing value for a corresponding address database field value is accurate). In some embodiments, a validation request asks the database update agent profiles to enter the most updated value for a corresponding database field value (e.g., the most updated address database field value of a provider database entity).

The term "database validation response" may refer to a data construct that is configured to describe a message that describes, for each database field value in the update-eligible field value subset for a corresponding database data entity, a validation response (e.g., a validation response describing a confirmation or rejection of an existing value for the database field value, a validation response describing an agent-entered value for the database field value, and/or the like). In some embodiments, the database validation response is a response received from the agent computing entity associated with a corresponding database update agent profile to the database validation query transmitted to the agent computing entity. In some of the noted embodiments, if the database validation query is associated with S database validation sub-queries for S database field values in the update-eligible field value subset of a corresponding database data entity, the database validation response includes S database validation sub-responses each describing whether the corresponding database update agent profile confirms the existing value of the corresponding database field value. In some embodiments, the required number of database validation responses is one. In some embodiments, the required number of database validation responses is a ratio of P (e.g., 100 percent of P).

The term "field value validity determination" may refer a data construct that is configured to describe whether the received database validation sub-responses for a corresponding database field value indicate that the corresponding database update agent profiles confirm that an existing value of the corresponding database field value is accurate. In some embodiments, if the field value validity determination describes that the received database validation responses indicate that the corresponding database update agent profiles confirm that an existing value of a corresponding database field value is accurate, then the field value validity determination is an affirmative field value validity determination. In some embodiments, if the field value validity determination describes that the received database validation responses indicate that the corresponding database update agent profiles do not confirm that an existing value of a corresponding database field value is accurate, then the field value validity determination is a negative field value validity determination.

The term "field value validity score" may refer a data construct that is configured to describe an estimated likelihood that a particular database field value is accurate/reliable based at least in part on response data associated with the database validation sub-responses for the particular database field value. In some embodiments, given R database validation responses, if $r_1$ of the R database validation responses describe (via the corresponding database validation sub-responses) that a particular database field value is confirmed by corresponding database update agent profiles (e.g., via direct confirmations of an existing value of the particular database field value, via confirmations by entering values that are identical to the existing value, via confirmations by entering values that have a threshold-satisfying similarity score relative to the existing value as determined by a natural language processing machine learning model, and/or the like), then the field value validity score for the particular database field value may be $r_1$. In some embodiments, to generate the field value validity score for a particular database field value, all of the confirmatory database update agent profiles associated with the particular database field value are first identified/determined, and then the agent scores for the confirmatory database update agent profiles are combined (e.g., summed up, averaged, and/or the like) to generate the field value validity score for the particular database field value. A confirmatory database update agent profile may be any database update agent profile whose corresponding database validation response describes that the database update agent profile confirms the existing value of a corresponding database agent profile.

The term "field value invalidity score" may refer a data construct that is configured to describe an estimated likelihood that a particular database field value is inaccurate/unreliable based at least in part on response data associated with the database validation sub-responses for the particular database field value. In some embodiments, given R database validation responses, if $r_2$ of the R database validation responses describe (via the corresponding database validation sub-responses) that a particular database field value is rejected by corresponding database update agent profiles (e.g., via direct rejections of an existing value of the particular database field value, via rejections by entering values that are non-identical to the existing value, via rejections by entering values that have a non-threshold-satisfying similarity score relative to the existing value as determined by a natural language processing machine learning model, and/or the like), then the field value invalidity score for the particular database field value may be $r_2$. In some embodiments, to generate the field value validity score for a particular database field value, all of the non-confirmatory database update agent profiles associated with the particular database field value are first identified/determined, and then the agent scores for the non-confirmatory database update agent profiles are combined (e.g., summed up, averaged, and/or the like) to generate the field value validity score for the particular database field value. A non-confirmatory database update agent profile may be any database update agent profile whose corresponding database validation response describes that the database update agent profile rejects the existing value of a corresponding database agent profile.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magneto resistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM FRAMEWORK

The system architecture 100 includes a database management system 101, one or more client computing entities 102, and one or more agent computing entities 103. The database management system 101 may be configured to receive database management requests (e.g., database retrieval requests, database modification requests, database configuration management requests, and/or the like) from the client computing entities 102, perform database management operations (e.g., database retrieval operations, database modification operations, database configuration management operations, and/or the like) in response to the database management requests, and optionally transmit any result data generated by the database management operations to the client computing entities 102. To perform the database management operations, the database management system 101 may maintain and update a database 110, by for example updating the database field values of the database 110 via communicating with the agent computing entities 103 and using the distributed database update management techniques described herein.

The database management system 101 may comprise a database management computing entity 106 and a storage subsystem 108. The database management computing entity 106 may be configured to receive database management requests (e.g., database retrieval requests, database modification requests, database configuration management requests, and/or the like) from the client computing entities 102, perform database management operations (e.g., database retrieval operations, database modification operations, database configuration management operations, and/or the like) in response to the database management requests, and optionally transmit any result data generated by the database management operations to the client computing entities 102. To perform the database management operations, the database management computing entity 106 may maintain and update a database 110, by for example updating the database field values of the database 110 via communicating with the agent computing entities 103 and using the distributed database update management techniques described herein.

The storage subsystem 108 may store a database 110 and configuration data 112 used by the database management computing entity 106 to perform various database management operations with respect to the database 110. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Database Management Computing Entity

FIG. 2 provides a schematic of a database management computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the database management computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the database management computing entity 106 may include or be in communication with a processing element 205 (also referred to as processors, processing circuitry, and/or similar terms used herein interchangeably) that communicate with other elements within the database management computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the database management computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the database management computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the database management computing entity 106 with the assistance of the processing element 205 and operating system.

As indicated, in one embodiment, the database management computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the database management computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the database management computing entity 106 may include or be in communication with one or more input elements, such as a keyboard input, a mouse input, a touch screen/display input, motion input, movement input, audio input, pointing device input, joystick input, keypad input, and/or the like. The database management computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the database management computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the database management computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the database management computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the database management computing entity 106 and/or various other computing entities.

In another embodiment, the client computing entity 102 may include one or more components or functionality that are the same or similar to those of the database management computing entity 106, as described in greater detail above. As will be recognized, these frameworks and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Exemplary Agent Computing Entity

FIG. 4 provides an illustrative schematic representative of an agent computing entity 103 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Agent computing entities 103 can be operated by various parties. As shown in FIG. 4, the agent computing entity 103 can include an antenna 412, a transmitter 404 (e.g., radio), a receiver 406 (e.g., radio), and a processing element 408 (e.g., CPLDs, microprocessors, multi-core processors, coprocessing entities, ASIPs, microcontrollers, and/or controllers) that provides signals to and receives signals from the transmitter 404 and receiver 406, correspondingly.

The signals provided to and received from the transmitter 404 and the receiver 406, correspondingly, may include signaling information/data in accordance with air interface standards of applicable wireless systems. In this regard, the agent computing entity 104 may be capable of operating with one or more air interface standards, communication protocols, modulation types, and access types. More particularly, the agent computing entity 103 may operate in accordance with any of a number of wireless communication standards and protocols, such as those described above with regard to the database management computing entity 106. In a particular embodiment, the agent computing entity 103 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the agent computing entity 103 may operate in accordance with multiple wired communication standards and protocols, such as those described above with regard to the database management computing entity 106 via a network interface 420.

Via these communication standards and protocols, the agent computing entity 103 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The agent computing entity 103 can also download changes, add-ons, and updates, for instance, to its firmware, software (e.g., including executable instructions, applications, program modules), and operating system.

According to one embodiment, the agent computing entity 103 may include location determining aspects, devices, modules, functionalities, and/or similar words used herein interchangeably. For example, the agent computing entity 103 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the agent computing entity's 103 position in connection with a variety of other systems, including cellular towers, Wi-Fi access points, and/or the like. Similarly, the agent computing entity 103 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The agent computing entity 103 may also comprise a user interface (that can include a display 416 coupled to a processing element 408) and/or a user input interface (coupled to a processing element 408). For example, the user interface may be a user application, browser, user interface, and/or similar words used herein interchangeably executing on and/or accessible via the agent computing entity 103 to interact with and/or cause display of information/data from the database management computing entity 106, as described herein. The user input interface can comprise any of a number of devices or interfaces allowing the agent computing entity 103 to receive data, such as a keypad 418 (hard or soft), a touch display, voice/speech or motion interfaces, or other input device. In embodiments including a keypad 418, the keypad 418 can include (or cause display of) the conventional numeric (0-9) and related keys (#, *), and other keys used for operating the agent computing entity 103 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The agent computing entity 103 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the agent computing entity 103. As indicated, this may include a user application that is resident on the entity or accessible through a browser or other user interface for communicating with the database management computing entity 106 and/or various other computing entities.

In another embodiment, the agent computing entity 103 may include one or more components or functionality that are the same or similar to those of the database management computing entity 106, as described in greater detail above. As will be recognized, these frameworks and descriptions are provided for exemplary purposes only and are not limiting to the various embodiments.

In various embodiments, the agent computing entity 103 may be embodied as an artificial intelligence (AI) computing entity, such as an Amazon Echo, Amazon Echo Dot, Amazon Show, Google Home, and/or the like. Accordingly, the agent computing entity 103 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present invention address technical challenges associated with decreasing operational load on database management systems by utilizing distributed database update management techniques to enhance accuracy/reliability of content data described by a database. When content data described by a database are inaccurate/unreliable, the number of user-initiated queries to the corresponding database management system increase over time, as users re-query the database management system to obtain updated content data, which in turn increases the operational load on the corresponding database management system thus threatening the operational integrity and effectiveness of the corresponding database management system. By disclosing techniques for increasing accuracy/reliability of content data described by a database using distributed database update management techniques, various embodiments of the present invention decrease operational load on database management systems via reducing user-initiated database queries. In this way, various embodiments of the present invention make important technical contributions to decreasing operational load on database management systems.

FIG. 5 is a flowchart diagram for an example process 500 for performing distributed database update management for a database entity of a database. Via the various steps/operations of the process 500, the database management computing entity 106 can perform database management operations based at least in part on database validation responses received from a set of R agent computing entities associated with R database update agent profiles. Although various embodiments of the present invention describe performing distributed database update management with respect to a single database entity of a database, a person of ordinary skill in the relevant technology will recognize that the techniques described herein can be performed with respect to any number of database entities of any number of database. For example, in some embodiments, given a database having E database entities, the process 500 may be performed E times in order to perform distributed database update management operations for the noted database and across all of the noted E database entities.

The process 500 begins at step/operation 501 when the database management computing entity 106 determines a total update utility measure for the database entity of the database. In some embodiments, a database is a collection of one or more structured data values that are stored in accordance with one or more data models. Examples of databases include a collection of one or more structured data values, such as one or more structured data values stored in accordance with a relational data model, one or more structured data values stored in accordance with an object-oriented data model, one or more structured data values stored in accordance with an object-relational data model, one or more structured data values stored in accordance with a hierarchical data model, one or more structured data values stored in accordance with a graph-based data model, and/or the like. In some embodiments, the structured data values of a database are stored on one computing entity. In some embodiments, the structured data values of a database are stored on multiple computing entities. In some embodiments, a database is associated with a set of database entities and comprises a set of database field values, as further described below. An example of a database is a provider directory database.

In some embodiments, a database entity is a collection of structured data values described by a database that all collectively relate to a defined real-world entity and/or a defined virtual entity. For example, in some embodiments, when the database is a provider directory database, a database entity may be a collection of structured data values that relate to a particular provider entity. In some of the noted exemplary embodiments, a database entity associated with the particular provider entity may describe a collection of structured data values that include one or more of: a first name associated with the particular provider entity, a last name associated with the particular provider entity, a street address associated with the particular provider entity, a city associated with the particular provider entity, a state associated with the particular provider entity, a zip code associated with the particular provider entity, an address type for each address associated with the particular provider entity, a phone number associated with the particular provider entity, a fax number associated with the particular provider entity, a structured data value describing whether the particular provider entity accepts new patients, a specialty designation associated with the particular provider entity, one or more demographic attributes associated with the particular provider entity, and/or the like. In some embodiments, each structured data value of a database entity is referred to herein as a database field value, while each structured data type of a structured data value is referred to herein as a database field. For example, when a particular provider entity is associated with a structured data value that describes a first name of the particular provider entity as "Jack," the particular provider entity may be associated with a database field value of "Jack" that is associated with a first name database field. Accordingly, in some embodiments, each database entity is associated with a set of F database field values, where each database field value of the set of database field values is associated with a database field of F database fields, with the F database fields being defined by a schema of the underlying database associated with the database entities.

Accordingly, a database field value may describe an atomic feature of a corresponding database entity as described by the underlying database. For example, a database entity associated with the particular provider entity may be associated with the following database field values: a first name associated with the particular provider entity, a last name associated with the particular provider entity, a street address associated with the particular provider entity, a city associated with the particular provider entity, a state associated with the particular provider entity, a zip code associated with the particular provider entity, an address type for each address associated with the particular provider entity, a phone number associated with the particular provider entity, a fax number associated with the particular provider entity, a structured data value describing whether the particular provider entity accepts new patients, a specialty designation associated with the particular provider entity, one or more demographic attributes associated with the particular provider entity, and/or the like. In some embodiments, each structured data value of a database entity is referred to herein as a database field value, while each structured data type of a structured data value is referred to herein as a database field. In some embodiments, each database field value of the F database field values associated with a database entity is associated with a distinct database field of F database fields, with the F database fields being defined by a schema of the underlying database associated with the database entities.

In some embodiments, step/operation 501 may be performed in accordance with the process that is depicted in FIG. 6, which is an example process for determining a total update utility measure for a database entity of a database. The process that is depicted in FIG. 6 begins at step/operation 601 when the database management computing entity 106 identifies the database field values of the database entity. Then, at step/operation 602, the database management computing entity 106 determines a per-field update utility measure for each database field value that is associated with the database entity. For example, given a database entity that is associated with a first name database field value, a last name database field value, and an address database field value, the database management computing entity 106 may determine a per-field update utility measure for the first name database field value, a per-field update utility measure for the last name database field value, and a per-field update utility measure for the address database field value. In general, given a database entity that is associated with F database field values, the database management computing entity 106 may generate F per-field update utility measures.

A per-field update utility measure may describe an estimated likelihood that updating a corresponding database field value will be integral to maintaining the database that comprises the corresponding database field value with the most up-to-date content. Accordingly, in some embodiments, the per-field update utility measure of a corresponding database field value that is associated with a particular database field may depend at least in part on the likelihood that database field values associated with the particular database field change as well as the last time the corresponding database field value is updated. For example, in some embodiments, the per-update utility measure of a database field value that describes the value "John" for a first name database field value may depend on: (i) how often do first name database field values change, and (ii) the last time the database field value was updated (e.g., was modified to reflect a new value if the update value differed relative to an existing value or was maintained with the existing value if the update value did not differ relative to the existing value). In some embodiments, the per-update utility measure for a corresponding database field value is determined based at least in part on the output of processing one or more field value feature values for the corresponding database field value using a field value temporal scoring machine learning model.

In some embodiments, a field value temporal scoring machine learning model is configured to process one or more field value feature values for a corresponding database field value to generate the per-field update utility measure for the corresponding database field value. Examples of field value feature values for a particular database field value include a field value update recency value for the particular database field value, a field modification frequency value for the corresponding database field, a field value update request frequency value for the particular database field value, and/or the like. In some embodiments, the field value temporal scoring machine learning model comprises a defined number of feedforward neural network layers that are collectively configured to process one or more field value feature values for a corresponding database field value to generate the per-field update utility measure for the corresponding database field value. In some embodiments, the field value temporal scoring machine learning model is trained based at least in part on recorded historical ground-truth labels/scores describing per-field update utility measures for database field values of a database in the past. In some embodiments, during each inferential iteration, the inputs to the field value temporal scoring machine learning model include a vector describing the field value feature values of an input database field value, while outputs of the field value temporal scoring machine learning model include a vector and/or an atomic value describing the per-field update utility measure for the noted input database field value.

An operational example of a field value temporal scoring machine learning model 700 is depicted in FIG. 7. As depicted in FIG. 7, the field value temporal scoring machine learning model 700 is configured to process a set of field value feature values 701 for an input database field value to generate a per-field update utility measure 702 for the input database field value. As further described below, the set of field value feature values 701 include a field value update recency value 711 for the input database field value, a field modification frequency value 712 for the database field of the input database field value, a field value update request frequency value 713 for the input database field value, an entity investigation frequency value 714 for the database entity that is associated with the input database field value, and an entity modification frequency value 715 for the database entity that is associated with the input database field value.

In some embodiments, the field value update recency value 711 describes a length of time (e.g., expressed in units of time) between a latest update of a corresponding database field value and a current time. For example, if a particular database field value is last updated 180 days ago, the field value update recency value for the particular database field value may describe the value of 180 and/or a discrete label associated with the value of 180. In some embodiments, given a set of database field values (e.g., given F*E database field values stored using a database that is associated with F database fields and E database entities), the update recency values for the noted database field values are normalized across the set of database field values to generate the field value update recency scores for the database field values, and the field value update recency values for the database field values are then generated based at least in part on the noted field value update recency scores for the database field values.

In some embodiments, the field modification frequency value 712 describes an estimated/computed likelihood that database field values associated with a corresponding database field change (i.e., be modified from a first value to a second value) in the future. For example, if the field modification frequency value for an address database field is higher than the field modification frequency value for a first name database field, this relationship may describe that address database field values are more likely to change than first name database field values. In some embodiments, given a set of F database fields as defined by the schema of a database, for each database field, a modification count is computed that describes the number of times that updates of database fields values associated with the database field have detected that the database fields values have changed in a defined historical period (e.g., in the last year). For example, given a database that is associated with two database entities, the modification count for a first name database field may describe the number of times the first name of the first database entity has been detected to have changed plus the number of times the first name of the second database entity has been detected to have changed. In some embodiments, once modification counts are computed for all of the database fields defined by the schema of a database, then those modification counts are normalized across the database fields to generate the normalized modification counts. In some embodiments, the field modification frequency values are then determined based at least in part on the normalized modification counts. For example, the normalized modification counts computed for all of the database fields defined by the schema of a database may be separated into a set of predefined buckets (e.g., a "High" bucket, a "Low" bucket, and a "Medium" bucket), and then the field modification frequency value for each database field may be determined based at least in part on the bucket in which the normalized modification count for the database field falls. In some embodiments, modification counts computed for all of the database fields defined by the schema of a database may be separated into a set of predefined buckets (e.g., a "High" bucket, a "Low" bucket, and a "Medium" bucket), and then the field modification frequency value for each database field may be determined based at least in part on the bucket in which the modification count for the database field falls.

In some embodiments, the field value update request frequency value 713 describes an estimated number of update requests for a corresponding database field value during a defined historical period (e.g., in the last year). For example, in some embodiments, the field value update request frequency value for a particular database field value describes a rate of requests for obtaining updated values for a database field value associated with a particular database entity as a share of all of the requests for obtaining updated values for all of the database field values associated with the particular database entity (e.g., a ratio of calls related to the address of a provider database entity to calls related to all of the feature data associated with the provider database entity). In an exemplary embodiments, if a database entity is associated with a first database field value $V_1$ that is associated with five historical update requests, a second database field value $V_2$ that is associated with six historical update requests, and a third database field value $V_3$ that is associated with seven historical update requests, then the field value update request frequency value for $V_1$ is determined based at least in part on 5/(5+6+7), the field value update request frequency value for $V_2$ is determined based at least in part on 6/(5+6+7), and the field value update request frequency value for $V_3$ is determined based at least in part on 7/(5+6+7).

In some embodiments, the entity investigation frequency value 714 describes a ratio of monitored data entries (e.g., monitored claim data entries) associated with a particular database entity (e.g., a particular provider database entity) that have gone through investigation/rework operations during a defined historical period and/or satisfy investigation/rework heuristics. For example, the entity investigation frequency value for a provider database entity may describe a ratio of claim data entries associated with the provider database entity that have gone through claim rework processes during a defined historical period and/or satisfy investigation/rework heuristics. In some embodiments, the entity investigation frequency value for a provider database entity is a Boolean feature that describes whether the provider claim rework rate for a particular provider database entity is significantly higher than an average provider claim rework rate across all of the E provider database entities of a provider directory database.

In some embodiments, the entity modification frequency value 715 describes an estimated/computed likelihood that database field values (e.g., demographic feature values, contractual feature values, and/or the like) associated with a corresponding database entity change in the future. For example, if the field modification frequency value for a first provider database entity is higher than the field modification frequency value for a second provider database entity, this relationship may describe that database field values of the first provider database entity are more likely to change than database field values of the second provider database entity. In some embodiments, given a set of E entities of a database, for each database entity, a modification count is computed that describes the number of times that updates of database fields values associated with the database entity have detected that the database fields values have changed in a defined historical period (e.g., in the last year). For example, given a database that is associated with a first name database field and a last name database field, the modification count for a database entity may describe the number of times the first name of the first database entity has been detected to have changed plus the number of times the last name of the second database entity has been detected to have changed. In some embodiments, once modification counts are computed for all of the database entities associated with a database, then those modification counts are normalized across the database entities to generate the normalized modification counts. In some embodiments, the entity modification frequency values are then determined based at least in part on the normalized modification counts. For example, the normalized modification counts computed for all of the database entities may be separated into a set of predefined buckets (e.g., a "High" bucket, a "Low" bucket, and a "Medium" bucket), and then the entity modification frequency value for each database entity may be determined based at least in part on the bucket in which the normalized modification count for the database entity falls. In some embodiments, modification counts computed for all of the database entities defined by the schema of a database may be separated into a set of predefined buckets (e.g., a "High" bucket, a "Low" bucket, and a "Medium" bucket), and then the entity modification frequency value for each database entity may be determined based at least in part on the bucket in which the modification count for the database entity falls.

An operational example of data determined based at least in part on input features and output features of a field value temporal scoring machine learning model are depicted in FIG. 8. In the table that is depicted in FIG. 8, each non-header row corresponds to a database field value of a particular database entity, each non-header value of the first column describes the database field of a corresponding database field value, each non-header value of the second column describes the field value update recency value of a corresponding database field value, each non-header value of the third column describes the field modification frequency value of a corresponding database field value, and each non-header value of the third column describes the per-field update utility measure of a corresponding database field value. For example, as depicted in FIG. 8, the address field value of a particular database entity was changed 360 days ago, the address database field is highly likely to change, and the address field value of the particular database entity is associated with a per-field update utility measure of 360 as determined by the field value temporal scoring machine learning model. As another example, as depicted in FIG. 8, the specialty field value of the particular database entity was changed 70 days ago, the specialty database field is unlikely to change, and the specialty field value of the particular database entity is associated with a per-field update utility measure of 70 as determined by the field value temporal scoring machine learning model.

Returning to FIG. 6, at step/operation 603, the database management computing entity 106 determines the total update utility measure for the database entity based at least in part on each per-field update utility measure for the F database field values of the database entity. In some embodiments, given a database entity that is associated with F database field values and thus F per-field update utility measures, the F per-field update utility measures are combined (e.g., summed up) to generate the total update utility measure for the database entity. For example, given a database entity associated with the five database field values whose relevant feature data is depicted in FIG. 8, a total update utility measure of 360+720+250+70+0=1400 may be determined.

Returning to FIG. 5, at step/operation 502, the database management computing entity 106 executes a set of distributed database update routines with respect to the database entity. In some embodiments, a distributed database update routine comprises a set of computer-implemented operations that are configured to transmit P database validation queries to P agent computing entities associated with P database update agent profiles, where the P database update agent profiles are associated with a corresponding database entity and may be determined based at least in part on an update region for the corresponding database entity. In some embodiments, each distributed database update routine is associated with a corresponding database update agent profile and is configured to transmit a database validation query to an agent computing entity associated with a corresponding database update agent profile, each database validation query comprises a plurality of database validation subqueries each describing a corresponding database field value in an update-eligible field value subset for a corresponding database entity, and each database validation query describes the total update utility measure for the corresponding database entity (e.g., as a reward measure for the database update agent profile, such as a reward measure presented within a gamification environment). In some embodiments, upon receiving a database validation response from a database update agent profile in response to a database validation query transmitted to an agent computing entity of the database update agent profile, an agent reward score for the database update agent profile (e.g., that may be used to provide proportional financial and/or in-game rewards to the database update agent profile) may be updated based at least in part on the total update utility measure for the database entity that is associated with the database validation query.

In some embodiments, step/operation 502 may be performed in accordance with the process that is depicted in FIG. 9, which is an example process for performing P distributed database update routines with respect to a database entity. The process that is depicted in FIG. 9 begins at step/operation 901 when the database management computing entity 106 determines an update region for the database entity. In some embodiments, the update region describes a geographic region comprising the geographic location designators for a set of P database update agent profiles. In some embodiments, the geographic region is a circular region around a geographic location designator for a database entity (e.g., a geographic location designator of an office location of a provider database entity), where the radius of the circular region is determined at least in part in a manner configured to ensure that P update agent profiles are associated with geographic location designators that fall within the circular region. In some of the noted embodiments, P is a required agent count hyperparameter that describes the required count of update agent profiles to which distributed database update routines related to a particular database entity are transmitted. In some embodiments, the P value for a database entity is determined based at least in part on the total update utility measure for the database entity.

In some embodiments, given a database entity that is associated with a particular total update utility measure, a P value for the database entity is determined based at least in part on processing the total update utility measure using a model (e.g., a trained linear regression machine learning model) that is configured to map the total update utility measure for a database entity to a required agent count hyperparameter for the database entity that describes the required count of update agent profiles to which distributed database update routines related to a particular database entity are transmitted. In some embodiments, after determining the P value for a database entity, the P value is mapped (e.g., using another trained linear regression model) to coordinate values (e.g., a radius value) for the database update region associated with the database entity using a model that is configured to map (e.g., based at least in part on the agent location density within an overall geographic region of a geographic location designator for a database entity) the P value for the database entity to the coordinate values for the database update region associated with the database entity. For example, the described model may map (e.g., based at least in part on the agent location density within an overall geographic region of a geographic location designator for a database entity) the P value for the database entity to the a radius value for a circular database update region associated with the database entity that has its centroid point at the geographic location designator for the database entity.

An operational example of generating a database update region 1000 is depicted in FIG. 10. As depicted in FIG. 10, the database update region is generated given a P=4 and by enlarging an initial database update region 1001 that failed to include P=4 geographic location designators for P database update agent profiles. In some embodiments, each database update agent profile is associated with a geographic location designator (e.g., the geographic location designator 1011 for Person A), and the database entity is also associated with an entity geographic location designator (e.g., the entity geographic location designator 1022). In some embodiments, the database update region 1000 is generated to ensure that P=4 geographic location designators for P=4 database update agent profiles are within the geographic region described by the database update region 1000.

Returning to FIG. 9, at step/operation 902, the database management computing entity 106 generates an update-eligible field value subset for the database entity that comprises each database field value of the database entity whose respective per-field utility measure satisfies (e.g., exceeds, exceeds or is equal to, and/or the like) a per-field update utility measure threshold (e.g., a per-field update utility measure threshold of zero, a per-field update utility measure threshold determined based at least in part on a distribution of per-field update utility measure thresholds for all of the database field values associated with the database entity, and/or the like). In some embodiments, given a database entity associated with F database field values that are in turn associated with F corresponding per-field update utility measures, if the corresponding per-field update utility measure for a particular database field value satisfies a per-field update utility measure threshold, then the particular database field value is included within the update-eligible field value subset for the target database entity. For example, given the database field values depicted in FIG. 8, and given a per-field update utility measure threshold of zero, the database field values of the first four non-header rows may be included in the update-eligible field value subset for the particular database entity, but the database field values of the first last non-header row may not be included in the update-eligible field value subset for the particular database entity.

At step/operation 903, the database management computing entity 106 transmits P database validation queries to P agent computing entities associated with the P database update agent profiles in the update region. Each database validation query may be a message transmitted by the database management computing entity 106 to an agent computing entity 103 for a database update agent profile whose geographic location designator is in the update region for a corresponding database entry, where the message: (i) comprises a plurality of database validation sub-queries each describing a field value validation request (i.e., a request for validation of) a corresponding database field value in the update-eligible field value subset for the corresponding database entity, and (ii) describes the total update utility measure for the corresponding database entity (e.g., describes the total update utility measure for the corresponding database entity as a reward measure in a gamification environment).

In some embodiments, each database update agent profile is a user profile (e.g., a user profile associated with a registered member of a collaborative software platform associated with the database management computing entity 106) that is associated with a geographic location designator (e.g., a home geographic location designator, a real-time geographic location designator such as a real-time geographic location designator determined using Global Positioning Sensor data, and/or the like). In some embodiments, if the geographic location designator for a database update agent profile is within an update region of a database entity and/or if the database update agent profile is selected as one of the P database update agent profiles for a database entity, then a database validation query is transmitted to an agent computing entity 103 associated with the particular database update agent profile (e.g., a smartphone computing entity associated with a particular member whose home location is within the target update region). Accordingly, given P database update agent profiles associated with a database entity, P database validation queries may be transmitted to the P agent computing entities associated with the noted P database update agent profiles. Each of the P database validation queries may include S database validation sub-queries associated with the S database field values in the update-eligible subset for the noted database entity.

A database validation sub-query may describe a request for validation of a database field value that is transmitted as part of a database validation query to an agent computing entity associated with a database update agent profiles. In some embodiments, given a database entity that is associated with a set of database update agent profiles including a database update agent profile $P_1$ that is associated with an agent computing entity $D_1$, and further given that the database entity is associated with three database field values $V_1$, $V_2$, and $V_3$ in the update-eligible field value subset for the database entity, a database validation query comprising three database validation sub-queries may be generated: a database validation sub-query that describes a validation request for $V_1$, a database validation sub-query that describes a validation request for $V_2$, and a database validation sub-query that describes a validation request for $V_3$. In some embodiments, a validation request asks the database update agent profiles to confirm if the existing value for a corresponding database field value is accurate (e.g., if the existing value for a corresponding address database field value is accurate). In some embodiments, a validation request asks the database update agent profiles to enter the most updated value for a corresponding database field value (e.g., the most updated address database field value of a provider database entity).

FIG. 11 depicts three user interfaces 1101-1103 that are generated based at least in part on data described by a database validation query. The user interfaces 1101-1103 may be display using a target agent computing entity associated with a target database update agent profile based at least in part on data described by a database validation query transmitted to the target agent computing entity and using a software application (e.g., a web browser application, a native non-web-browser application, and/or the like) that operates on the target agent computing entity. For example, user interface 1101 may depict data related to all of the database field values in the update eligible field value subset for a corresponding database entity as described by a database validation query related to the corresponding database entity, user interface 1102 may depict data related to one of the database validation sub-queries associated with the corresponding database entity (i.e., the database validation sub-query relating to the address database field value for the corresponding database entity) as described by a database validation query related to the corresponding database entity, and user interface 1103 may depict (e.g., after interaction with the user interface element 1111) the total update utility measure for the corresponding database entity. As depicted in FIG. 11, the corresponding database entity is a provider database entity associated with Dr. Annie Hall.

Returning to FIG. 9, at step/operation 904, subsequent to transmitting the P database validation queries to the P agent computing entities at step/operation 903, the database management computing entity 106 receives a required number of database validation response each associated with a respective database update agent profile. A database validation response may be a message that describes, for each database field value in the update-eligible field value subset for a corresponding database data entity, a validation response (e.g., a validation response describing a confirmation or rejection of an existing value for the database field value, a validation response describing an agent-entered value for the database field value, and/or the like). In some embodiments, the database validation response is a response received from the agent computing entity associated with a corresponding database update agent profile to the database validation query transmitted to the agent computing entity. In some of the noted embodiments, if the database validation query is associated with S database validation sub-queries for S database field values in the update-eligible field value subset of a corresponding database data entity, the database validation response includes S database validation sub-responses each describing whether the corresponding database update agent profile confirms the existing value of the corresponding database field value. In some embodiments, the required number of database validation responses is one. In some embodiments, the required number of database validation responses is a ratio of P (e.g., 100 percent of P).

For example, given a database entity that is associated with a set of database update agent profiles including a database update agent profile $P_1$ that is associated with an agent computing entity $D_1$, and further given that the database entity is associated with three database field values $V_1$, $V_2$, and $V_3$ in the update-eligible field value subset for the database entity, a database validation query comprising three database validation sub-queries may be generated: a database validation sub-query that describes a validation request for $V_1$, a database validation sub-query that describes a validation request for $V_2$, and a database validation sub-query that describes a validation request for $V_3$. In this example, after the database validation query is transmitted to $D_1$, a database validation response may be received from $D_1$, where the database validation response may include three data validation sub-responses: a data validation sub-response that describes a validation/rejection outcome for $V_1$, a data validation sub-response that describes a validation/rejection outcome for $V_2$, and a data validation sub-response that describes a validation/rejection outcome for $V_3$. For example, in the user interface 1102 of FIG. 2, if the corresponding database update agent profile clicks on the Yes button, a confirmatory data validation sub-response may be generated and transmitted as part of a database validation response, while a non-confirmatory (i.e., rejecting) data validation sub-response may be generated and transmitted as part of a database validation response if the No button is clicked and/or if the Not Sure button is clicked by the corresponding database update agent profile.

At step/operation 503, the database management computing entity 106 performs one or more database management operations in relation to the database based at least in part on field value validity determinations based at least in part on database field validation responses. In some embodiments, to perform the database management operations, the database management computing entity 106 determines a field value validity determination for each database field value in the update-eligible field value subset based at least in part on each database validation response received at step/operation 904. In some embodiments, the field value validity determination describes whether the received database validation responses indicate that the corresponding database update agent profiles confirm that an existing value of a corresponding database field value is accurate. In some embodiments, if the field value validity determination describes that the received database validation responses indicate that the corresponding database update agent profiles confirm that an existing value of a corresponding database field value is accurate, then the field value validity determination is an affirmative field value validity determination. In some embodiments, if the field value validity determination describes that the received database validation responses indicate that the corresponding database update agent profiles do not confirm that an existing value of a corresponding database field value is accurate, then the field value validity determination is a negative field value validity determination.

As described above, in some embodiments, given R database validation responses each including S database validation sub-responses, each database field value in the update-eligible field value subset of a corresponding database entity is associated with R database validation sub-responses across the R database validation responses. For example, given a two database validation responses $R_1$ and $R_2$ (where two is equal to or exceeds a required number of database validation responses), and given two database field values $V_1$ and $V_2$ in a corresponding update-eligible field value subset (i.e., given S=2), then $R_1$ may include a database validation sub-response $SR_{11}$ that describes a confirmation/rejection outcome by a first database update agent profile with respect to $V_1$ and a database validation sub-response $SR_{12}$ that describes a confirmation/rejection outcome by the first database update agent profile with respect to $V_2$, while $R_2$ may include a database validation sub-response $SR_{21}$ that describes a confirmation/rejection outcome by a second database update agent profile with respect to $V_1$ and a database validation sub-response $SR_{22}$ that describes a confirmation/rejection outcome by the second database update agent profile with respect to $V_2$. In this example, the field value validity determination for $V_1$ may be determined based at least in part on the database validation sub-response $SR_{11}$ and the database validation sub-response $SR_{21}$, while the field value validity determination for $V_2$ may be determined based at least in part on the database validation sub-response $SR_{12}$ and the database validation sub-response $SR_{22}$.

In some embodiments, step/operation 503 may be performed in accordance with the process that is depicted in FIG. 12, which is an example process for determining the field value validity determination for a particular database field value that is in the update-eligible field value subset of a particular database entity (e.g., a particular provider database entity). The process that is depicted in FIG. 12 begins at step/operation 1201 when the database management computing entity 106 determines a field value validity score for the particular database field value. In some embodiments, the field value validity score describes an estimated likelihood that a particular database field value is accurate/reliable based at least in part on response data associated with the database validation sub-responses for the particular database field value. In some embodiments, given R database validation responses, if $r_1$ of the R database validation responses describe (via the corresponding database validation sub-responses) that a particular database field value is confirmed by corresponding database update agent profiles (e.g., via direct confirmations of an existing value of the particular database field value, via confirmations by entering values that are identical to the existing value, via confirmations by entering values that have a threshold-satisfying similarity score relative to the existing value as determined by a natural language processing machine learning model, and/or the like), then the field value validity score for the particular database field value may be $r_1$.

For example, given a two database validation responses $R_1$ and $R_2$ (where two is equal to or exceeds a required number of database validation responses), and given two database field values $V_1$ and $V_2$ in a corresponding update-eligible field value subset (i.e., given S=2), then $R_1$ may include a database validation sub-response $SR_{11}$ that describes a confirmation/rejection outcome by a first database update agent profile with respect to $V_1$ and a database validation sub-response $SR_{12}$ that describes a confirmation/rejection outcome by the first database update agent profile with respect to $V_2$, while $R_2$ may include a database validation sub-response $SR_{21}$ that describes a confirmation/rejection outcome by a second database update agent profile with respect to $V_1$ and a database validation sub-response $SR_{22}$ that describes a confirmation/rejection outcome by the second database update agent profile with respect to $V_2$. In this example, if $SR_{11}$ confirms an existing value of $V_1$ while $SR_{21}$ rejects the existing value of $V_1$, then $V_1$ may be associated with a field value validity score of one. Furthermore, in this example, if $SR_{12}$ confirms an existing value of $V_2$ and $SR_{22}$ also confirms the existing value of $V_2$, then $V_2$ may be associated with a field value validity score of two.

In some embodiments, to generate the field value validity score for a particular database field value, all of the confirmatory database update agent profiles associated with the particular database field value are first identified/determined, and then the agent scores for the confirmatory database update agent profiles are combined (e.g., summed up, averaged, and/or the like) to generate the field value validity score for the particular database field value. A confirmatory database update agent profile may be any database update agent profile whose corresponding database validation response describes that the database update agent profile confirms the existing value of a corresponding database agent profile.

For example, given a two database validation responses $R_1$ and $R_2$ (where two is equal to or exceeds a required number of database validation responses) that are associated with two database update agent profiles $P_1$ and $P_2$ that are associated with agent scores $W_1$ and $W_2$ respectively, and given two database field values $V_1$ and $V_2$ in a corresponding update-eligible field value subset (i.e., given S=2), then $R_1$ may include a database validation sub-response $SR_{11}$ that describes a confirmation/rejection outcome by a first database update agent profile with respect to $V_1$ and a database validation sub-response $SR_{12}$ that describes a confirmation/rejection outcome by the first database update agent profile with respect to $V_2$, while $R_2$ may include a database validation sub-response $SR_{21}$ that describes a confirmation/rejection outcome by a second database update agent profile with respect to $V_1$ and a database validation sub-response $SR_{22}$ that describes a confirmation/rejection outcome by the second database update agent profile with respect to $V_2$. In this example, if $SR_{11}$ confirms an existing value of $V_1$ while $SR_{21}$ rejects the existing value of $V_1$, then $V_1$ may be associated with a field value validity score that is determined based at least in part on $W_1$, as $P_1$ is the sole confirmatory database update agent profile for $V_1$. Furthermore, in this example, if $SR_{12}$ confirms an existing value of $V_2$ and $SR_{22}$ also confirms the existing value of $V_2$, then $V_2$ may be associated with a field value validity score that is determined based at least in part on the combination of $W_1$ and $W_2$ (e.g., based at least in part on $W_1+W_2$), as $P_1$ and $P_2$ are both confirmatory database update agent profiles for $V_2$.

At step/operation 1202, the database management computing entity 106 determines a field value invalidity score for the particular database field value. In some embodiments, the field value invalidity score describes an estimated likelihood that a particular database field value is inaccurate/unreliable based at least in part on response data associated with the database validation sub-responses for the particular database field value. In some embodiments, given R database validation responses, if $r_2$ of the R database validation responses describe (via the corresponding database validation sub-responses) that a particular database field value is rejected by corresponding database update agent profiles (e.g., via direct rejections of an existing value of the particular database field value, via rejections by entering values that are non-identical to the existing value, via rejections by entering values that have a non-threshold-satisfying similarity score relative to the existing value as determined by a natural language processing machine learning model, and/or the like), then the field value invalidity score for the particular database field value may be $r_2$.

For example, given a two database validation responses $R_1$ and $R_2$ (where two is equal to or exceeds a required number of database validation responses), and given two database field values $V_1$ and $V_2$ in a corresponding update-eligible field value subset (i.e., given S=2), then $R_1$ may include a database validation sub-response $SR_{11}$ that describes a confirmation/rejection outcome by a first database update agent profile with respect to $V_1$ and a database validation sub-response $SR_{12}$ that describes a confirmation/rejection outcome by the first database update agent profile with respect to $V_2$, while $R_2$ may include a database validation sub-response $SR_{21}$ that describes a confirmation/rejection outcome by a second database update agent profile with respect to $V_1$ and a database validation sub-response $SR_{22}$ that describes a confirmation/rejection outcome by the second database update agent profile with respect to $V_2$. In this example, if $SR_{11}$ confirms an existing value of $V_1$ while $SR_{21}$ rejects the existing value of $V_1$, then $V_1$ may be associated with a field value invalidity score of one. Furthermore, in this example, if $SR_{12}$ confirms an existing value of $V_2$ and $SR_{22}$ also confirms the existing value of $V_2$, then $V_2$ may be associated with a field value invalidity score of zero.

In some embodiments, to generate the field value validity score for a particular database field value, all of the non-confirmatory database update agent profiles associated with the particular database field value are first identified/determined, and then the agent scores for the non-confirmatory database update agent profiles are combined (e.g., summed up, averaged, and/or the like) to generate the field value validity score for the particular database field value. A non-confirmatory database update agent profile may be any database update agent profile whose corresponding database validation response describes that the database update agent profile rejects the existing value of a corresponding database agent profile.

For example, given a two database validation responses $R_1$ and $R_2$ (where two is equal to or exceeds a required number of database validation responses) that are associated with two database update agent profiles $P_1$ and $P_2$ that are associated with agent scores $W_1$ and $W_2$ respectively, and given two database field values $V_1$ and $V_2$ in a corresponding update-eligible field value subset (i.e., given S=2), then $R_1$ may include a database validation sub-response $SR_{11}$ that describes a confirmation/rejection outcome by a first database update agent profile with respect to $V_1$ and a database validation sub-response $SR_{12}$ that describes a confirmation/rejection outcome by the first database update agent profile with respect to $V_2$, while $R_2$ may include a database validation sub-response $SR_{21}$ that describes a confirmation/rejection outcome by a second database update agent profile with respect to $V_1$ and a database validation sub-response $SR_{22}$ that describes a confirmation/rejection outcome by the second database update agent profile with respect to $V_2$. In this example, if $SR_{11}$ confirms an existing value of $V_1$ while $SR_{21}$ rejects the existing value of $V_1$, then $V_1$ may be associated with a field value invalidity score that is determined based at least in part on $W_2$, as $P_2$ is the sole non-confirmatory database update agent profile for $V_1$. Furthermore, in this example, if $SR_{12}$ confirms an existing value of $V_2$ and $SR_{22}$ also confirms the existing value of $V_2$, then $V_2$ may be associated with a field value validity score that is determined based at least in part on neither of $W_1$ and $W_2$ (e.g., is equal to zero), as $P_1$ and $P_2$ are both confirmatory database update agent profiles for $V_2$, and thus the set of non-confirmatory database update agent profiles for $V_2$ is an empty set.

At step/operation 1203, the database management computing entity 106 determines the field value validity determination for the particular database field value based at least in part on at least one of the field value validity score for the particular database field value and the field value invalidity score for the particular database field value. In some embodiments, in response to determining that the field validity score satisfies a field validity score threshold that is determined based at least in part on the field value invalidity score (e.g., a field validity score threshold that equals the field value invalidity score, a field validity score threshold that equals the output of a trained linear regression model that operates on field value invalidity score, and/or like), database management computing entity 106 determines that the particular database field value is associated with an affirmative field value validity determination. In some embodiments, in response to determining that the field validity score fails to satisfy a field validity score threshold that is determined based at least in part on the field value invalidity score (e.g., a field validity score threshold that equals the field value invalidity score), the database management computing entity 106 determines that the particular database field value is associated with a negative field value validity determination.

At step/operation 1204, the database management computing entity 106 performs the one or more database management operations based at least in part on the field value validity determination. In some embodiments, the database management computing entity 106 generates user interface data for a database management operation output user interface that describes one or more database field values that are associated with negative field value validity determinations, and transmits the user interface data to a client computing entity 102 that is configured to display the database management operation output user interface based at least in part on the user interface data received from the database management computing entity 106. An operational example of such a database management operation output user interface 1300 is depicted in FIG. 13. As depicted in FIG. 13, the database management operation output user interface 1300 describes the address data field value for the database entity 1301 is associated with a negative field value validity determination as well as a field value invalidity score of 0.66. As further depicted in FIG. 13, the database management operation output user interface 1300 describes the patient acceptance indicator data field value for the database entity 1302 is associated with a negative field value validity determination as well as a field value invalidity score of 0.73. In some embodiments, the database management computing entity 106 generates user interface data for a database management operation output user interface that describes one or more database field values that are associated with affirmative field value validity determinations, and transmits the user interface data to a client computing entity 102 that is configured to display the database management operation output user interface based at least in part on the user interface data received from the database management computing entity 106.

Returning to FIG. 5, in some embodiments, step/operation 503 may include performing a set of agent score adjustment operations. In some embodiments, each score adjustment operation is associated with a database update agent profile that has generated data for a database validation response for a database entity and a database field value in the update-eligible field value subset of the database entity. In some embodiments, given S database field values in the update-eligible subset for the noted database entity and R database update agent profiles that have generated data for database validation responses with respect to a database entity, S*R agent score adjustment operations are performed, where each agent score adjustment operation is configured to adjust the agent score of a corresponding database update agent profile that has generated data for a database validation response for the database entity based at least in part on whether the database validation sub-response associated with a corresponding database field value of the database entity is consistent with a ground-truth validity indicator for the corresponding database field value.

For example, in some embodiments, given a database entity whose update-eligible field value subset includes a database field value $V_1$ and a database field value $V_2$ (and thus given S=2) for a database entity, and further given two database update agent profiles $P_1$ and $P_2$ that have generated data for database validation responses with respect to the database entity (and thus given R=2), four agent score adjustment operations can be performed: (i) a first agent score adjustment operation that adjusts the agent score of $P_1$ based at least in part on whether the database validation sub-response generated by $P_1$ with respect to $V_1$ corresponds to the ground-truth field validity indicator for $V_1$, (ii) a second agent score adjustment operation that adjusts the agent score of $P_2$ based at least in part on whether the database validation sub-response generated by $P_2$ with respect to $V_1$ corresponds to the ground-truth field validity indicator for $V_1$, (iii) a third agent score adjustment operation that adjusts the agent score of $P_1$ based at least in part on whether the database validation sub-response generated by $P_1$ with respect to $V_2$ corresponds to the ground-truth field validity indicator for $V_2$, and (iv) a fourth agent score adjustment operation that adjusts the agent score of $P_2$ based at least in part on whether the database validation sub-response generated by $P_2$ with respect to $V_2$ corresponds to the ground-truth field validity indicator for $V_2$.

In some embodiments, performing an agent score adjustment operation with respect to a database update agent profile and a database field value comprises: (i) performing an agent score upward adjustment operation with respect to the agent score of the database update agent profile if the database update agent profile is a confirmed database update agent profile with respect to the database field value, and (ii)

performing an agent score downward adjustment operation with respect to the agent score of the database update agent profile if the database update agent profile is a non-confirmed database update agent profile with respect to the database field value and the database update agent profile is associated with a threshold-satisfying historical inconsistency score.

A ground-truth field validity indicator may describe a confirmed/observed value for a database field value of a database entity. For example, the ground-truth field validity indicator for a name database field value may describe a confirmed/observed name of a corresponding provider database entity. As another example, the ground-truth field validity indicator for an address database field value may describe a confirmed/observed address of a corresponding provider database entity. In some embodiments, the ground-truth field validity indicator for a database field value may be determined based at least in part on the output of one or more database field value investigation operations, such as database field value investigation operations performed based at least in part on data received in response to requesting confirmed/observed values from an entity server associated with a database entity, and/or database field value investigation operations performed based at least in part on a distribution of database validation sub-responses associated with the corresponding database field value. In some embodiments, if the confirmed/observed value for a database field value is different relative to a pre-existing value for the database field value, the ground-truth field validity indicator for the database field value is a negative ground-truth field validity indicator. In some embodiments, if the confirmed/observed value for a database field value is the same as a pre-existing value for the database field value, the ground-truth field validity indicator for the database field value is an affirmative ground-truth field validity indicator.

A confirmed database update agent profile may describe a database update agent profile that has generated data for a database validation sub-response associated with a corresponding database field value, where the database validation sub-response describes content data that is consistent relative to the ground-truth field validity indicator associated with the corresponding database field value. In some embodiments, a confirmed database update agent profile for a database field value is either: (i) a confirmatory database update agent profile with respect to the database field value when the ground-truth field validity indicator is a negative ground-truth field validity indicator, or (ii) a non-confirmatory database update agent profile with respect to the database field value when the ground-truth field validity indicator is an affirmative ground-truth field validity indicator. For example, if a database update agent profile describes that a pre-existing value for a database field value is accurate/reliable, and if the ground-truth field validity indicator for the database field value also describes that the pre-existing value for the database field value is accurate/reliable, then the noted database update agent profile is a confirmed database update agent profile. As another example, if a database update agent profile describes that a pre-existing value for a database field value is inaccurate/unreliable, and if the ground-truth field validity indicator for the database field value also describes that the pre-existing value for the database field value is inaccurate/unreliable, then the noted database update agent profile is a confirmed database update agent profile.

A non-confirmed database update agent profile may describe a database update agent profile that has generated data for a database validation sub-response associated with a corresponding database field value, where the database validation sub-response describes content data that is inconsistent relative to the ground-truth field validity indicator associated with the corresponding database field value. In some embodiments, a non-confirmed database update agent profile for a database field value is either: (i) a confirmatory database update agent profile with respect to the database field value when the ground-truth field validity indicator is an affirmative ground-truth field validity indicator, or (ii) a non-confirmatory database update agent profile with respect to the database field value when the ground-truth field validity indicator is a negative ground-truth field validity indicator. For example, if a database update agent profile describes that a pre-existing value for a database field value is accurate/reliable, and if the ground-truth field validity indicator for the database field value also describes that the pre-existing value for the database field value is inaccurate/unreliable, then the noted database update agent profile is a non-confirmed database update agent profile. As another example, if a database update agent profile describes that a pre-existing value for a database field value is inaccurate/unreliable, and if the ground-truth field validity indicator for the database field value also describes that the pre-existing value for the database field value is accurate/reliable, then the noted database update agent profile is a non-confirmed database update agent profile.

In some embodiments, when a database update agent profile is a confirmed database update agent profile with respect to a particular database field value of a database entry, an agent score upward adjustment operation is performed by increasing the agent score for the database update agent profile based at least in part on the upward agent score adjustment value for the database update agent profile. In some embodiments, the upward agent score adjustment value for a database update agent profile is determined based at least in part on a response latency value associated with the database update response that is associated with the database update agent profile, where the response latency value describes a measure of time length between transmission of a database validation query associated with the database entry and receipt of the database validation response associated with the database entry and the generated by the database update agent profile. For example, if a database validation query for a database entry is transmitted to a database update agent profile at 2:00 PM and the corresponding database validation response associated with the database update agent profile is received at 3:31 PM, the response latency value associated with the database update agent profile may be 91 and may be used to determine the upward agent score adjustment value for the noted database update agent profile. In some embodiments, the upward agent score adjustment value for a database update agent profile is a value selected from the range [0, 1].

In some embodiments, when a database update agent profile is a non-confirmed database update agent profile with respect to a particular database field value of a database entry, and the database update agent profile is associated with a threshold-satisfying historical inconsistency score, an agent score downward adjustment operation is performed by decreasing the agent score for the database update agent profile based at least in part on the downward agent score adjustment value for the database update agent profile. In some embodiments, the historical inconsistency score describes the number of consecutive instances where a database validation responses by a database update agent profile has caused the database update agent profile to be classified as a non-confirmed database update agent profile.

In some embodiments, each time a database update agent profile submits response data that is then found to be inconsistent with ground-truth field value validity indicators, the historical inconsistency score for the database update agent profile is incremented until a next instance in which the response data for the database update agent profile is then found to be consistent with ground-truth field value validity indicators. In some embodiments, every time the database update agent profile is determined to be a non-confirmed database update agent profile, the historical inconsistency score for the database update agent profile is incremented. If the incremented historical inconsistency score satisfies (e.g., exceeds) a historical inconsistency score threshold (e.g., a historical inconsistency score of two), then the agent score for the database update agent profile is decremented by a downward agent score adjustment value (e.g., a predefined downward agent score adjustment value). In some embodiments, the downward agent score adjustment value for a database update agent profile is a value selected from the range [0, 1].

For example, consider an instance in which the first database validation sub-response of a database update agent profile describes that the confirmed value for a database field value $V_1$ is a, while the ground-truth field value validity indicator for $V_1$ describes that the confirmed value for $V_1$ is b. In this case, the historical inconsistency score for the database update agent profile may be set to one. If, in the following database validation sub-response, the database update agent profile describes that the confirmed value for a database field value $V_2$ is c, and the ground-truth field value validity indicator for $V_2$ describes that the confirmed value for $V_1$ is c, then the historical inconsistency score for the database update agent profile may be set to zero again. During each inconsistent and non-confirmed response by a database update agent profile, if the historical invalidity score for the database update agent profile satisfies a historical invalidity score threshold (e.g., is three or more), then the agent score for the database update agent profile is decremented by a downward agent score adjustment value (e.g., a predefined downward agent score adjustment value). In some embodiments, the agent score of a database update agent profile describes a social credibility score for the noted database update agent profile.

Other examples of database management operations include: (i) storing permanent and/or temporarily relational database tables that include data determined based at least in part on the one or more query results (e.g., data determined based at least in part on the output of one or more join operations performed based at least in part on the query results), (ii) storing data determined based at least in part on the one or more query results (e.g., data determined based at least in part on the output of one or more join operations performed based at least in part on the query results) as one or more index files for the query-compliant hash database, (iii) setting one or more operational parameters of the query-compliant hash database based at least in part on the one or more query results (e.g., data determined based at least in part on the output of one or more join operations performed based at least in part on the query results), (iv) storing data determined based at least in part on the one or more query results (e.g., data determined based at least in part on the output of one or more join operations performed based at least in part on the query results) as one or more files stored using memorization techniques (e.g., one or more files stored using memorization techniques on one or more cache storage mediums), and (iv) determining one or more new expected query structure for an underlying database associated with the query-compliant hash database based at least in part on the one or more query results (e.g., data determined based at least in part on the output of one or more join operations performed based at least in part on the query results).

Accordingly, as described above, various embodiments of the present invention address technical challenges associated with decreasing operational load on database management systems by utilizing distributed database update management techniques to enhance accuracy/reliability of content data described by a database. When content data described by a database are inaccurate/unreliable, the number of user-initiated queries to the corresponding database management system increase over time, as users re-query the database management system to obtain updated content data, which in turn increases the operational load on the corresponding database management system thus threatening the operational integrity and effectiveness of the corresponding database management system. By disclosing techniques for increasing accuracy/reliability of content data described by a database using distributed database update management techniques, various embodiments of the present invention decrease operational load on database management systems via reducing user-initiated database queries. In this way, various embodiments of the present invention make important technical contributions to decreasing operational load on database management systems.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although, specific terms are employed herein, they are used in a generic and descriptive sense only and not for purposes of limitation.

The invention claimed is:

1. A computer-implemented method comprising:
identifying, by one or more processors, a plurality of database field values for a database entity of a database, wherein a database field value of the plurality of database field values comprises one or more field value feature values;
inputting, by the one or more processors and to a trained machine learning model, the one or more field value feature values associated with the database field value, wherein the trained machine learning model is configured to process the one or more field value feature values for the database field value to generate an update utility measure for the database field value;
obtaining, by the one or more processors and from the trained machine learning model, the update utility measure for the database field value;
including, by the one or more processors, the database field value in an update-eligible field value subset of the plurality of database field values when the update utility measure of the database field value satisfies a utility measure threshold;
determining, by the one or more processors, a total update utility measure for the database entity based at least in part on the update-eligible field value subset;

determining, by the one or more processors, an update region for the database entity, wherein the update region is associated with a plurality of database update agent profiles;

executing, by the one or more processors, a plurality of distributed database update routines, wherein: (i) each distributed database update routine of the plurality of distributed database update routines is associated with a corresponding database update agent profile in the plurality of database update agent profiles and is configured to transmit a database validation query to an agent computing entity associated with the corresponding database update agent profile, (ii) each database validation query comprises a plurality of database validation sub-queries each describing a field value validation request for the database field value in the update-eligible field value subset, and (iii) each database validation query describes the total update utility measure for the database entity;

subsequent to executing the plurality of distributed database update routines, receiving, by the one or more processors, one or more database validation responses, wherein the one or more database validation responses are received from one or more agent computing entities associated with respective ones of the plurality of database update agent profiles;

for one or more database field values in the update-eligible field value subset, determining, by the one or more processors, a field value validity score based at least in part on a number of value confirmations within the one or more database validation responses; and performing, by the one or more processors, one or more of a database retrieval, modification, or configuration operation on the database based at least in part on the field value validity score.

2. The computer-implemented method of claim 1, wherein the one or more field value feature values for the database field value comprise a field value update recency value for the database field value and a field modification frequency value for the database field value.

3. The computer-implemented method of claim 2, wherein the one or more field value feature values for the database field value comprise a field value update request frequency value for the database field value and an entity investigation frequency value for the database entity.

4. The computer-implemented method of claim 1, wherein determining the field value validity score further comprises:

determining one or more confirmatory database update agent profiles of the plurality of database update agent profiles, wherein the one or more confirmatory database update agent profiles are associated with respective one or more database validation responses that describe an affirmative per-field validation indicator for the database field value; and determining the field value validity score based at least in part on one or more agent scores associated with the one or more confirmatory database update agent profiles.

5. The computer-implemented method of claim 4, wherein performing the one or more of a database retrieval, modification, or configuration operation on the database comprises:

determining one or more non-confirmatory database update agent profiles of the plurality of database update agent profiles, wherein the one or more non-confirmatory database update agent profiles are associated with respective one or more database validation responses that describe a negative per-field validation indicator for the database field value;

determining a field value invalidity score based at least in part on one or more agent scores associated with the one or more non-confirmatory database update agent profiles; and performing the one or more of a database retrieval, modification, or configuration operation on the database based at least in part on the field value validity score and the field value invalidity score.

6. The computer-implemented method of claim 5, wherein performing the one or more of a database retrieval, modification, or configuration operation on the database based at least in part on the field value validity score and the field value invalidity score comprises:

responsive to determining that the field value validity score satisfies a field validity score threshold determined based at least in part on the field value invalidity score, determining that the database field value is associated with an affirmative field value validity determination; and performing the one or more of a database retrieval, modification, or configuration operation on the database based at least in part on the affirmative field value validity determination.

7. The computer-implemented method of claim 5, wherein performing the one or more of a database retrieval, modification, or configuration operation on the database based at least in part on the field value validity score and the field value invalidity score comprises:

responsive to determining that the field value validity score fails to satisfy a field validity score threshold determined based at least in part on the field value invalidity score, determining that the database field value is associated with a negative field value validity determination; and performing the one or more of a database retrieval, modification, or configuration operation on the database based at least in part on the negative field value validity determination.

8. The computer-implemented method of claim 1, wherein performing the one or more of a database retrieval, modification, or configuration operation on the database comprises:

for the database field value:
determining a ground-truth field validity indicator;
determining one or more confirmed database update agent profiles of the plurality of database update agent profiles for the database field value, wherein one of the one or more confirmed database update agent profiles is either: (i) a confirmatory database update agent profile with respect to the database field value when the ground-truth field validity indicator is a negative ground-truth field validity indicator, or (ii) a non-confirmatory database update agent profile with respect to the database field value when the ground-truth field validity indicator is an affirmative ground-truth field validity indicator; and for the one or more confirmed database update agent profiles:
determining an upward agent score adjustment value, and performing an agent score upward adjustment operation for an agent score of the one or more confirmed database update agent profiles based at least in part on the upward agent score adjustment value for the one or more confirmed database update agent profiles.

9. The computer-implemented method of claim 8, wherein the upward agent score adjustment value for the one or more confirmed database update agent profiles is determined based at least in part on a response latency value associated with a database validation response that is associated with the one or more confirmed database update agent profiles.

10. The computer-implemented method of claim 1, wherein performing the one or more of a database retrieval, modification, or configuration operation on the database comprises:
for the database field value:
determining a ground-truth field validity indicator;
determining one or more non-confirmed database update agent profiles of the plurality of database update agent profiles for the database field value, wherein one of the one or more non-confirmed database update agent profiles is either: (i) a confirmatory database update agent profile with respect to the database field value when the ground-truth field validity indicator is an affirmative ground-truth field validity indicator, or (ii) a non-confirmatory database update agent profile with respect to the database field value when the ground-truth field validity indicator is a negative ground-truth field validity indicator; and
for any of the one or more non-confirmed database update agent profiles that are associated with a threshold-satisfying historical inconsistency score:
determining a downward agent score adjustment value, and
performing an agent score downward adjustment operation for an agent score of the non-confirmed database update agent profile based at least in part on the downward agent score adjustment value for the non-confirmed database update agent profile.

11. A system comprising one or more processors and at least one memory storing processor executable instructions that, when executed by the one or more processors, cause the one or more processors to:
identify a plurality of database field values for a database entity of a database, wherein a database field value of the plurality of database field values comprises one or more field value feature values;
input, to a trained machine learning model, the one or more field value feature values associated with the database field value, wherein the trained machine learning model is configured to process the one or more field value feature values for the database field value to generate an update utility measure for the database field value;
obtain, from the trained machine learning model, the update utility measure for the database field value;
include the database field value in an update-eligible field value subset of the plurality of database field values when the update utility measure of the database field value satisfies a utility measure threshold;
determine a total update utility measure for the database entity based at least in part on the update-eligible field value subset;
determine an update region for the database entity, wherein the update region is associated with a plurality of database update agent profiles;
execute a plurality of distributed database update routines, wherein: (i) each distributed database update routine of the plurality of distributed database update routines is associated with a corresponding database update agent profile in the plurality of database update agent profiles and is configured to transmit a database validation query to an agent computing entity associated with the corresponding database update agent profile, (ii) each database validation query comprises a plurality of database validation sub-queries each describing a field value validation request for the database field value in the update-eligible field value subset, and (iii) each database validation query describes the total update utility measure for the database entity;
subsequent to executing the plurality of distributed database update routines, receive one or more database validation responses, wherein the one or more database validation responses are received from one or more agent computing entities associated with respective ones of the plurality of database update agent profiles;
for one or more database field values in the update-eligible field value subset, determine a field value validity score based at least in part on a number of value confirmations within the one or more database validation responses; and
perform one or more of a database retrieval, modification, or configuration operation on the database based at least in part on the field value validity score.

12. The system of claim 11, wherein the one or more field value feature values for the database field value comprise a field value update recency value for the database field value and a field modification frequency value for the database field value.

13. The system of claim 12, wherein the one or more field value feature values for the database field value comprise a field value update request frequency value for the database field value and an entity investigation frequency value for the database entity.

14. The system of claim 11, wherein, to determine the field value validity score, the processor executable instructions further cause the one or more processors to:
determine one or more confirmatory database update agent profiles of the plurality of database update agent profiles, wherein the one or more confirmatory database update agent profiles are associated with respective one or more database validation responses that describe an affirmative per-field validation indicator for the database field value; and
determine the field value validity score based at least in part on one or more agent scores associated with the one or more confirmatory database update agent profiles.

15. The system of claim 14, wherein to perform the one or more of a database retrieval, modification, or configuration operation on the database, the processor executable instructions further cause the one or more processors to:
determine one or more non-confirmatory database update agent profiles of the plurality of database update agent profiles, wherein the one or more non-confirmatory database update agent profiles are associated with respective one or more database validation responses that describe a negative per-field validation indicator for the database field value;
determine a field value invalidity score based at least in part on one or more agent scores associated with the one or more non-confirmatory database update agent profiles; and perform the one or more of a database retrieval, modification, or configuration operation on the database based at least in part on the field value validity score and the field value invalidity score.

16. The system of claim 15, wherein to perform the one or more of a database retrieval, modification, or configuration operation on the database based at least in part on the field value validity score and the field value invalidity score, the processor executable instructions further cause the one or more processors to:
responsive to determining that the field value validity score satisfies a field validity score threshold determined based at least in part on the field value invalidity score, determine that the database field value is associated with an affirmative field value validity determination; and
perform the one or more of a database retrieval, modification, or configuration operation on the database based at least in part on the affirmative field value validity determination.

17. The system of claim 15, wherein to perform the one or more of a database retrieval, modification, or configuration operation on the database based at least in part on the field value validity score and the field value invalidity score, the processor executable instructions further cause the one or more processors to:
responsive to determining that the field value validity score fails to satisfy a field validity score threshold determined based at least in part on the field value invalidity score, determine that the database field value is associated with a negative field value validity determination; and
perform the one or more of a database retrieval, modification, or configuration operation on the database based at least in part on the negative field value validity determination.

18. The system of claim 11, wherein to perform the one or more of a database retrieval, modification, or configuration operation on the database, the processor executable instructions further cause the one or more processors to:
for the database field value:
determine a ground-truth field validity indicator;
determine one or more confirmed database update agent profiles of the plurality of database update agent profiles for the database field value, wherein one of the one or more confirmed database update agent profiles is either: (i) a confirmatory database update agent profile with respect to the database field value when the ground-truth field validity indicator is a negative ground-truth field validity indicator, or (ii) a non-confirmatory database update agent profile with respect to the database field value when the ground-truth field validity indicator is an affirmative ground-truth field validity indicator; and
for the one or more confirmed database update agent profiles:
determine an upward agent score adjustment value, and
perform an agent score upward adjustment operation for an agent score of the one or more confirmed database update agent profiles based at least in part on the upward agent score adjustment value for the one or more confirmed database update agent profiles.

19. The system of claim 18, wherein the upward agent score adjustment value for the one or more confirmed database update agent profiles is determined based at least in part on a response latency value associated with a database validation response that is associated with the one or more confirmed database update agent profiles.

20. One or more non-transitory computer-readable storage media including instructions that, when executed by one or more processors, cause the one or more processors to:
identify a plurality of database field values for a database entity of a database, wherein a database field value of the plurality of database field values comprises one or more field value feature values;
input, to a trained machine learning model, the one or more field value feature values associated with the database field value, wherein the trained machine learning model is configured to process the one or more field value feature values for the database field value to generate an update utility measure for the database field value;
obtain, from the trained machine learning model, the update utility measure for the database field value;
include the database field value in an update-eligible field value subset of the plurality of database field values when the update utility measure of the database field value satisfies a utility measure threshold;
determine a total update utility measure for the database entity based at least in part on the update-eligible field value subset;
determine an update region for the database entity, where the update region is associated with a plurality of database update agent profiles;
execute a plurality of distributed database update routines, wherein: (i) each distributed database update routine of the plurality of distributed database update routines is associated with a corresponding database update agent profile in the plurality of database update agent profiles and is configured to transmit a database validation query to an agent computing entity associated with the corresponding database update agent profile, (ii) each database validation query comprises a plurality of database validation sub-queries each describing a field value validation request for the database field value in the update-eligible field value subset, and (iii) each database validation query describes the total update utility measure for the database entity;
subsequent to executing the plurality of distributed database update routines, receive one or more database validation responses, wherein the one or more database validation responses are received from one or more agent computing entities associated with respective ones of the plurality of database update agent profiles;
for one or more database field values in the update-eligible field value subset, determine a field value validity score based at least in part on a number of value confirmations within the one or more database validation responses; and
perform one or more of a database retrieval, modification, or configuration operation on the database based at least in part on the field value validity score.

* * * * *